(12) United States Patent
Kamo

(10) Patent No.: US 7,385,769 B2
(45) Date of Patent: Jun. 10, 2008

(54) IMAGE FORMING OPTICAL SYSTEM, AND IMAGE PICKUP APPARATUS AND IDENTIFICATION APPARATUS USING THE SYSTEM

(75) Inventor: Yuji Kamo, Hino (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 11/514,448

(22) Filed: Aug. 31, 2006

(65) Prior Publication Data

US 2007/0053075 A1  Mar. 8, 2007

(30) Foreign Application Priority Data

Sep. 5, 2005  (JP)  ............................. 2005-256524

(51) Int. Cl.
*G02B 17/00* (2006.01)
(52) U.S. Cl. .................. 359/733; 359/770; 359/793
(58) Field of Classification Search ............... 359/733, 359/781, 782, 783, 762, 680, 691
See application file for complete search history.

(56) References Cited

U.S. PATENT DOCUMENTS

| 4,037,938 A | 7/1977 | Yamashita et al. |
| 6,339,508 B1 | 1/2002 | Nozawa et al. |
| 2004/0184641 A1 | 9/2004 | Nagasaka et al. |
| 2005/0254690 A1 | 11/2005 | Nagasaka et al. |

FOREIGN PATENT DOCUMENTS

| JP | 08-334691 | 12/1996 |
| JP | 11-205664 | 7/1999 |
| JP | 2002-297257 | 10/2002 |
| JP | 2003-098430 | 4/2003 |
| JP | 2003-187235 | 7/2003 |
| JP | 2003-307673 | 10/2003 |

*Primary Examiner*—Timothy Thompson
(74) *Attorney, Agent, or Firm*—Kenyon & Kenyon LLP

(57) ABSTRACT

An image forming optical system comprising, in order from an object side: a negative lens unit having one or two negative lenses without including any positive lens; a reflecting member; an aperture stop; and a positive lens unit having one or two positive lenses without including any negative lens.

22 Claims, 18 Drawing Sheets

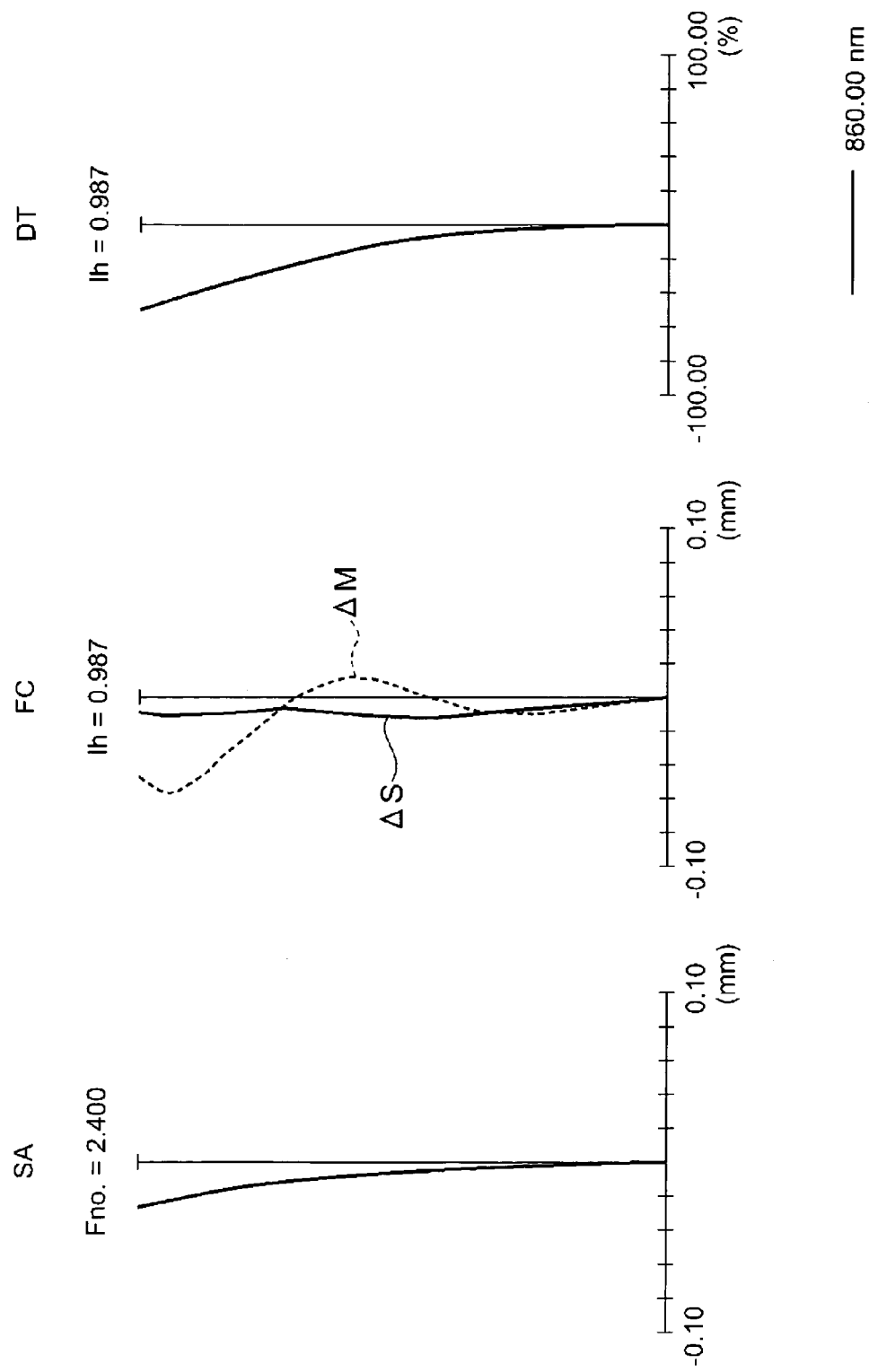

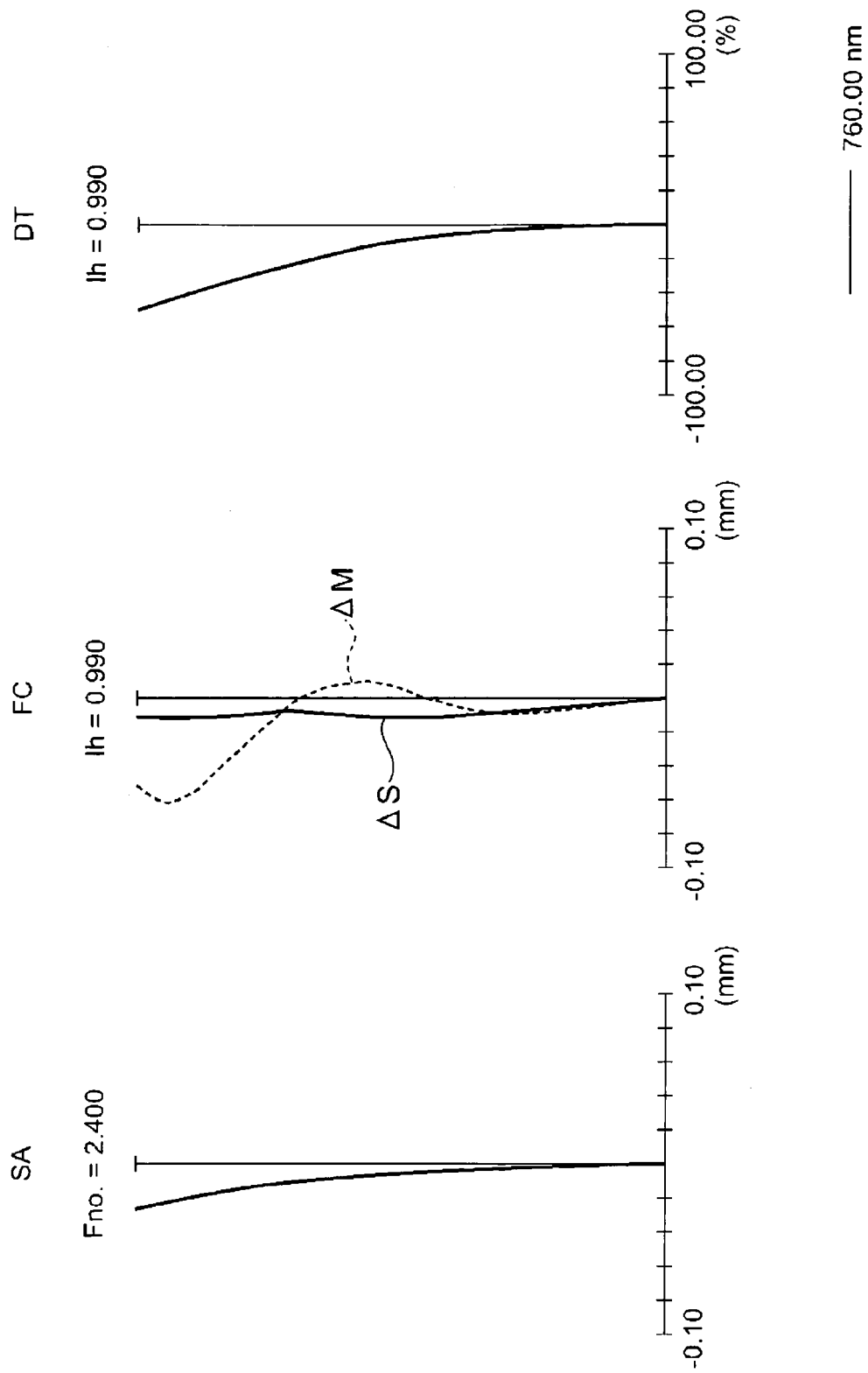

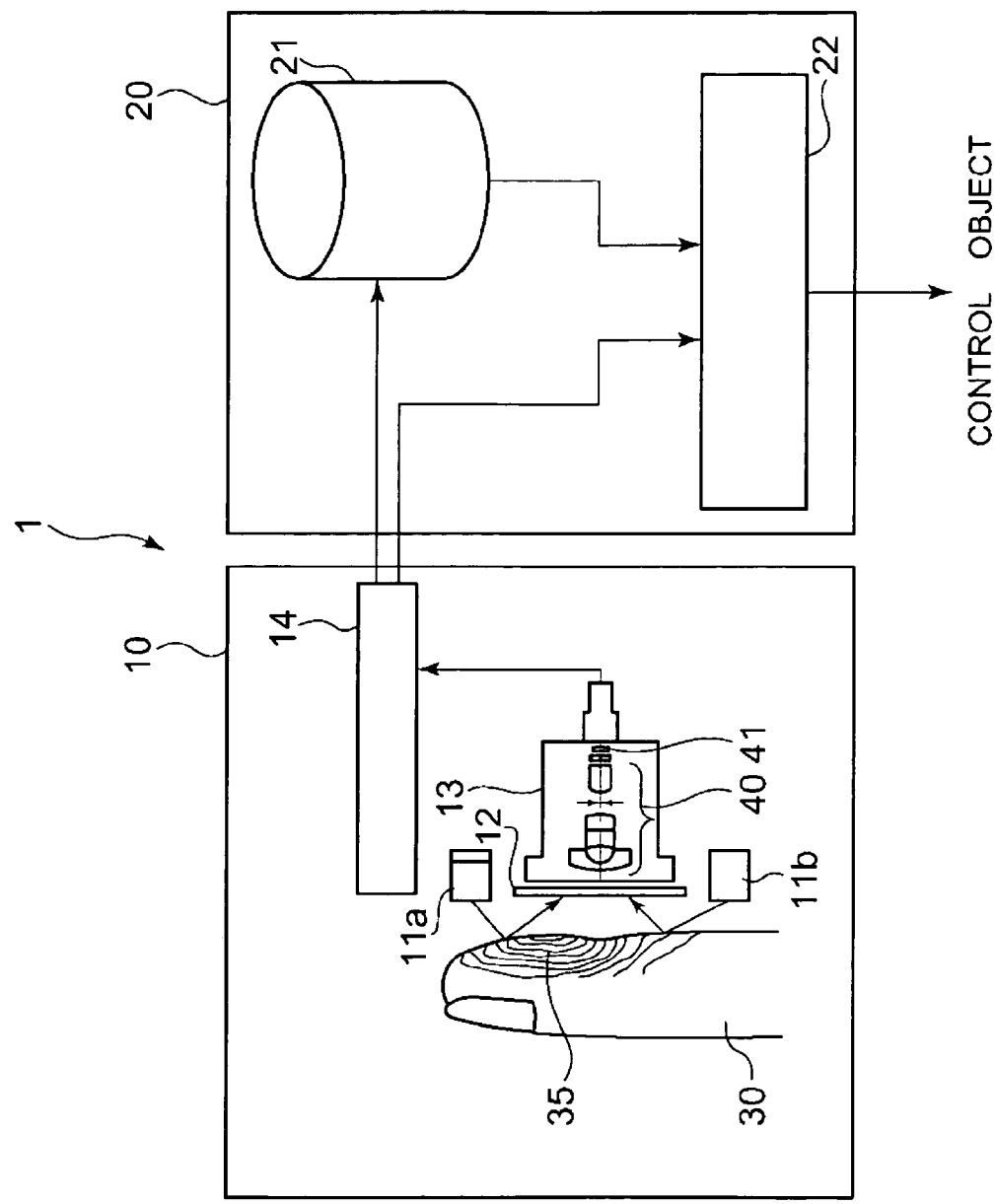

IMAGE FORMING OPTICAL SYSTEM, AND IMAGE PICKUP APPARATUS AND IDENTIFICATION APPARATUS USING THE SYSTEM

CROSS REFERENCE TO RELATED APPLICATION

This application claims benefit under 35 U.S.C. § 119 of Japanese Patent Applications of No. 2005-256,524 filed in Japan on Sep. 5, 2005, the contents of which are incorporated herein by reference.

BACKGROUND OF THE INVENTION

1. Field of the Invention

The present invention relates to an image forming optical system, and an image pickup apparatus and an identification apparatus using the system.

2. Description of the Related Art

In entering or going out of a facility where security is regarded as important, or in a case of log-in to an information system or the like, confidentiality has heretofore been protected using an IC card or password. However, illegal actions such as forgery and spoofing often cause leakage of information and hacking, and there is a demand for an identification method having higher security. Therefore, in recent years, biological identification (biometrics) has prevailed in which a person is identified using person's physical features such as fingerprint, palm pattern, iris and vein.

As a technology concerning an optical system for such biological identification, there is proposed a technology described in Japanese Patent Application Laid-Open No. 8-334,691.

However, the system described in Japanese Patent Application Laid-Open No. 8-334,691 is an object-side telecentric optical system. Therefore, a lens diameter of a lens disposed closest to an object side increases depending on a size of an object surface, that is, a finger size. Any design for miniaturizing the optical system is not considered in Japanese Patent Application Laid-Open No. 8-334,691, and it is difficult to miniaturize the optical system.

As means for miniaturizing the optical system, there is a method of disposing a reflecting member in an optical path to bend the optical path. As technologies concerning the optical system in which the optical path is bent using the reflecting member, there are proposed, for example, Japanese Patent Application Laid-Open Nos. 2000-292,692, 51-62,053 and 11-205,664.

In the optical systems described in Japanese Patent Application Laid-Open Nos. 2000-292,692 and 51-62,053, each of the systems is constituted by arranging a first lens unit, the reflecting member for bending the optical path and a second lens unit in order from the object side.

Moreover, the optical system described in Japanese Patent Application Laid-Open No. 11-205,664 is constituted by arranging the first lens unit and the reflecting member for being the optical path in order from the object side.

SUMMARY OF THE INVENTION

In one aspect, an image forming optical system of the present invention comprises, in order from an object side: a negative lens unit having one or two negative lenses without including any positive lens; a reflecting member having an incidence surface which is concave on the object side and an exit surface which is convex toward an image side; an aperture stop; and a positive lens unit having one or two positive lenses without including any negative lens.

Moreover, in another aspect, an image forming optical system of the present invention comprises, in order from an object side: a negative lens unit having one or two negative lenses without including any positive lens; an optical path deflecting element; an aperture stop; and a positive lens unit having one or two positive lenses without including any negative lens, and the system satisfies the following condition:

$$0.05 < d_o/Oh < 0.8,$$

wherein do denotes a length from an object point to a lens of the image forming optical system closest to the object side measured on an optical axial, and Oh denotes a maximum object height.

The image forming optical system of the present invention has high performance, but has less lenses. The system can be small-sized, and cost can be reduced.

When the above image forming optical system is combined with an image sensor such as a CCD image sensor or a CMOS image sensor, a small-sized image pickup apparatus can be constituted. When such a small-sized image pickup apparatus is combined with a light source which irradiates an object with light, it is possible to constitute, for example, an identification apparatus for performing biological identification.

BRIEF DESCRIPTION OF THE DRAWINGS

FIG. 3 is an aberration diagram at a time when a wavelength of light for use is set to 860 nm and the image forming optical system is focused on an infinite object in Example 1, SA denotes a spherical aberration, FC denotes an astigmatism, and DT denotes a distortion, respectively;

FIG. 4 is an aberration diagram at a time when a wavelength of light for use is set to 760 nm and the image forming optical system is focused on an infinite object in Example 1, SA denotes a spherical aberration, FC denotes an astigmatism, and DT denotes a distortion, respectively;

FIG. 17B shows an example in which the image forming optical system of the present invention is applied to a finger print identification apparatus.

DETAILED DESCRIPTION OF THE PREFERRED EMBODIMENT

Figure 1:
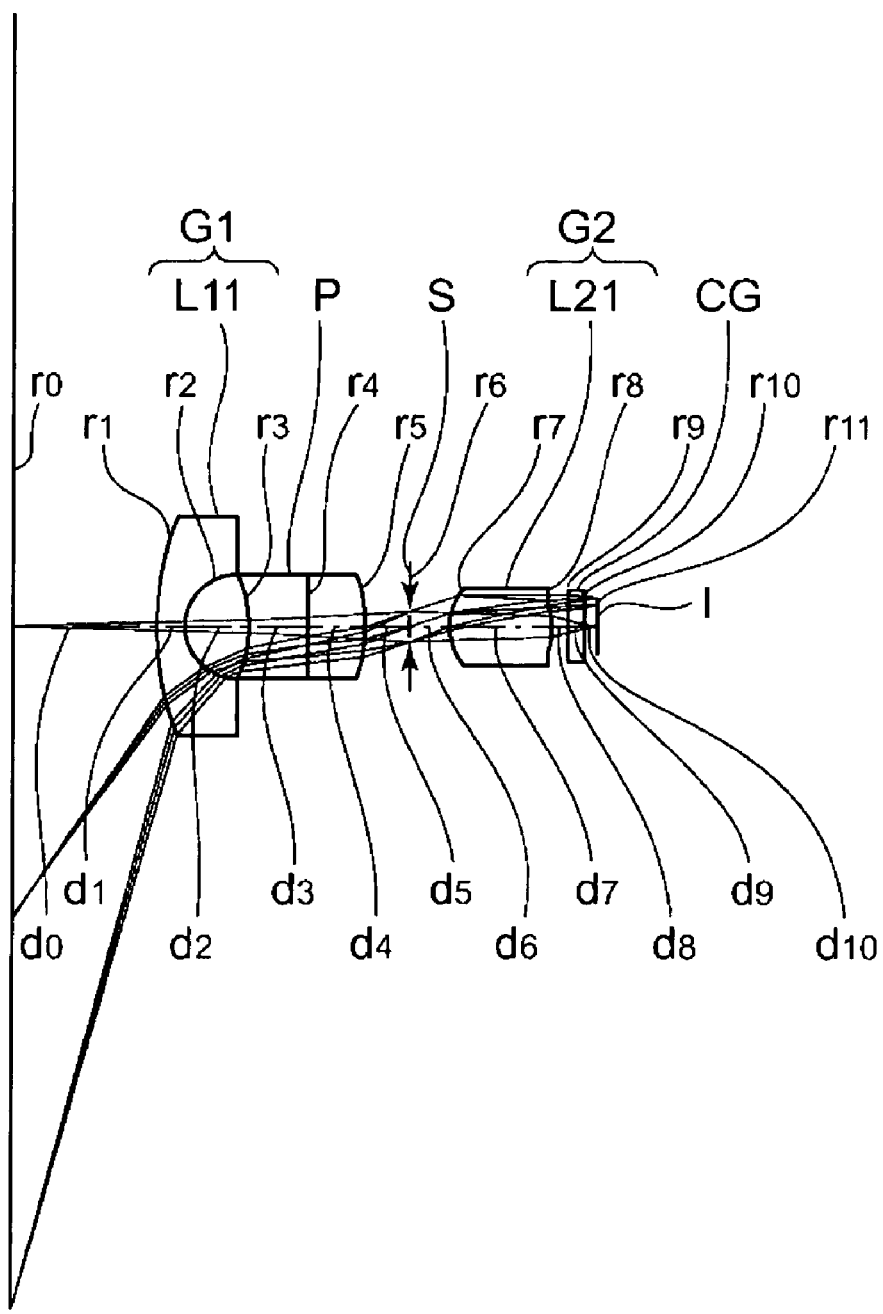
FIG. 1 is a sectional view showing Example 1 of an image forming optical system of the present invention in a state in which an optical axis is straightened.

As described above, in one aspect, the image forming optical system of the present invention comprises, in order from an object side: a negative lens unit having one or two negative lenses without including any positive lens; a prism having an incidence surface which is concave on the object side and an exit surface which is convex toward an image side; an aperture stop; and a positive lens unit having one or two positive lenses without including any negative lens.

Moreover, in another aspect, the image forming optical system of the present invention comprises, in order from an object side: a negative lens unit having one or two negative lenses without including any positive lens; an optical path deflecting element; an aperture stop; and a positive lens unit having one or two positive lenses without including any negative lens, and the system satisfies the following condition:

$0.05 < d_0/Oh < 0.8$, wherein $d_0$ denotes a length from an object to a lens of the image forming optical system closest to the object side measured on an optical axis, and Oh denotes a maximum object height.

To miniaturize the image forming optical system, two respects are necessary: reduction of lens diameter; and reduction of total length of the optical system. As to the reduction of the lens diameter, when the optical system is constituted as an object-side telecentric optical system as in the conventional examples, in principle, the size of the lens closest to the object side is substantially equal to the object height. Therefore, it is difficult to reduce the lens diameter.

To solve the problem, in the image forming optical system of the present invention, as a basic constitution, a wide-angle optical system is adopted so that a height of ray incident on the lens is reduced relative to the object height. That is, a retrofocus type suitable for the wide-angle optical system is adopted, and the negative lens unit and the positive lens unit are arranged in order from the object side.

However, when the retrofocus type optical system is simply adopted, the total length of the optical system increases. To solve the problem, when an optical path deflecting element is disposed in the optical path to bend the optical axis, the image forming optical system is miniaturized so as to be reduced in the thickness direction. Here, the optical path deflecting element means an element which bends the optical path, and examples of the optical path deflecting element include a prism having a reflective surface, a mirror and an optical fiber.

Moreover, to reduce cost, the image forming optical system needs to be constituted of the minimum number of the lenses in accordance with an application of the system. When many positive lenses are combined with many negative lenses, aberrations can be canceled and corrected. Therefore, high performance can be achieved, but the number of the lenses constituting the image forming optical system cannot be reduced, and it is therefore difficult to reduce the cost. On the other hand, when the number of the lenses constituting the image forming optical system is simply reduced, the performance cannot be secured.

When the image forming optical system is constituted by arranging, in order from the object side, the negative lens unit having one or two negative lenses without including any positive lens, and the positive lens unit having one or two positive lenses without including any negative lens, the number of the lenses constituting the image forming optical system can be minimized, and the cost can be reduced.

Moreover, when the negative lens unit and the positive lens unit are constituted without mixing lenses having opposite-sign powers, the power of each lens does not have to be strengthened more than necessary. Therefore, generation of spherical aberration and coma can be reduced.

Furthermore, as the optical path deflecting element, there is used a prism having an incidence surface which is concave on the object side and an exit surface which is convex toward the image side. In this case, an aberration correcting effect can be imparted to the optical path deflecting element. Therefore, even if the number of the lenses constituting the optical system is reduced, the performance can be secured.

In addition, when the incidence surface of the prism is constituted to be concave on the object side, a negative lens effect can be imparted to this incidence surface. Therefore, the power of the negative lens unit disposed on the object side of the prism can be weakened, and the generation of the coma can be reduced.

Moreover, when the incidence surface of the prism is constituted to be concave on the object side, the entrance pupil position can be shifted toward the object side. Therefore, the ray height on the incidence side of the negative lens unit can be lowered, and each lens diameter can be reduced.

Furthermore, when the exit surface of the prism is constituted to be convex toward the image side, a positive lens effect can be imparted to this exit surface. Therefore, the power of the positive lens unit disposed on the image side of the prism can be weakened, and the generation of coma can similarly be reduced.

In addition, when the aperture stop is disposed between the exit surface of the prism and the positive lens unit, the lens diameter of the negative lens unit can be reduced. Moreover, since the angle of the ray incident on the light receiving element can be set to be nearly parallel to the optical axis, the ray can efficiently be received even in the case where the CCD image sensor or the like is used.

Moreover, it is preferable that the above image forming optical system satisfies the following condition (1):

$$0.05 < d_0/Oh < 0.8 \qquad (1),$$

wherein $d_0$ denotes a length from the object point to the lens of the image forming optical system closest to the object side measured on the optical axis, and Oh denotes a maximum object height.

The condition (1) defines a relation between the size of an object and the distance from the object point to the image forming optical system. In a case where the condition (1) is satisfied, even when the optical system is constituted to have a wide angle, the performance can be secured with less lenses.

If the value of $d_0/Oh$ is above the upper limit of the condition (1), the total length of the optical system including the object distance becomes excessively large. Even if the optical path deflecting element is used, it becomes difficult to miniaturize the optical system sufficiently.

If the value of $d_0/Oh$ is below the lower limit of the condition (1), the image forming optical system has an excessively wide angle, and both of the powers of the negative lens unit and the positive lens unit become excessively strong. Therefore, spherical aberration and coma are excessively generated, and it becomes difficult to secure the performance.

It is more preferable to satisfy the following condition (1-1):

$$0.12 < d_0/Oh < 0.6 \qquad (1\text{-}1).$$

Moreover, in the above image forming optical system, it is preferable that the negative lens unit and the positive lens unit forming the retro-focus type satisfy the following condition (2):

$$-3.0 < fn/fp < -0.2 \qquad (2),$$

wherein fn denotes a focal length of the negative lens unit, and fp denotes a focal length of the positive lens unit.

If the value of fn/fp is above the upper limit of the condition (2), the power of the negative lens unit becomes excessively strong, and coma and distortion are excessively generated. Alternatively, the power of the positive lens unit is excessively weakened, and the total length of the optical system increases.

On the other hand, if the value of fn/fp is below the lower limit of the condition (2), the power of the positive lens unit becomes excessively strong, and spherical aberration and coma are excessively generated. Alternatively, the power of the negative lens unit is excessively weakened, and the diameter of the negative lens increases.

It is more preferable to satisfy the following condition (2-1):

$$-2.0 < fn/fp < -0.35 \qquad (2\text{-}1).$$

Moreover, in the above image forming optical system, it is preferable that a position to bend the optical axis satisfies the following condition (3), $$0.15 < df/dr < 1.5 \qquad (3),$$

wherein df denotes a distance along the optical axis from the first surface of the negative lens unit to the position to bend the optical axis, and dr denotes a distance along the optical axis from the position to bend the optical axis to the image surface.

If the value of df/dr is above the upper limit of the condition (3), the size of the image forming optical system in the thickness direction becomes excessively large.

On the other hand, if the value of df/dr is below the lower limit of the condition (3), the size of the image forming optical system in the bending direction (direction of the deflected optical axis) becomes excessively large. Either of the values is disadvantageous in miniaturizing the image forming optical system.

It is more preferable to satisfy the following condition (3-1):

$$0.25 < df/dr < 1.2 \qquad (3\text{-}1).$$

Moreover, in the above image forming optical system, it is preferable that the negative lens unit forming the retro-focus type satisfies the following condition (4):

$$-5 < fn/Ih < -1 \qquad (4),$$

wherein fn denotes the focal length of the negative lens unit, and Ih denotes the maximum image height.

If the value of fn/Ih is above the upper limit of the condition (4), the negative power becomes excessively strong, and coma and distortion are excessively generated.

On the other hand, if the value of fn/Ih is below the lower limit of the condition (4), the negative power is excessively weakened, a sufficient back focus cannot be secured, and it becomes difficult to achieve the wide angle. Here, the back focus means a distance between the image surface and the rearmost surface of the image forming optical system. If the back focus is increased, or the wide angle is achieved, the image forming optical system easily enlarges.

It is more preferable to satisfy the following condition (4-1):

$$-4 < fn/Ih < -1.2 \qquad (4\text{-}1).$$

Moreover, in the above image forming optical system, it is preferable that the positive lens unit forming the retrofocus type satisfies the following condition (5):

$$1 < fp/Ih < 5 \qquad (5),$$

wherein fp denotes the focal length of the positive lens unit, and Ih is the maximum image height.

If the value of fp/Ih is above the upper limit of the condition (5), the positive power is excessively weakened, a sufficient back focus cannot be taken, and it becomes difficult to achieve the wide angle. If the back focus is increased, or the wide angle is achieved, the image forming optical system easily enlarges.

On the other hand, if the value of fp/Ih is below the lower limit of the condition (5), the positive power becomes excessively strong, and spherical aberration and coma are excessively generated.

It is more preferable to satisfy the following condition (5-1), $$1.2 < fp/Ih < 4 \qquad (5\text{-}1).$$

Moreover, it is preferable that the above image forming optical system satisfies the following condition (6), $$0.01 < Ih/Oh < 0.1 \qquad (6),$$

wherein Ih denotes the maximum image height, and Oh denotes the maximum object height.

If the value of Ih/Oh is above the upper limit of the condition (6), a magnification of the image forming optical system becomes excessively large, and the optical system enlarges.

On the other hand, if the value of Ih/Oh is below the lower limit of the condition (6), the magnification of the image forming optical system becomes excessively small, and the power of the optical system increases. Therefore, spherical aberration, coma and the like are largely generated, and the performance of the system is deteriorated.

It is more preferable to satisfy the following condition (6-1), $$0.02 < Ih/Oh < 0.085 \quad (6\text{-}1).$$

Moreover, in the above image forming optical system, when the optical path deflecting element is constituted of a prism, the aberration correcting effect can be imparted to the incidence refractive surface and the exit refractive surface. This is preferable in view of the optical performance.

In this case, it is preferable that the radius of curvature of the incidence refractive surface of the prism satisfies the following condition (7):

$$0.05 < |r_{1r}/r_{in}| < 0.9 \quad (7),$$

wherein $r_{1r}$ denotes the radius of curvature of an image-side surface of a first negative lens, and $r_{in}$ denotes the radius of curvature of the incidence refractive surface of the prism. Here, the first negative lens is a lens disposed in the foremost position in the negative lens unit.

If the value of $|r_{1r}/r_{in}|$ is above the upper limit of the condition (7), the negative lens effect of the incidence refractive surface of the prism becomes relatively excessively strong. Therefore, coma and astigmatism are generated in the incidence refractive surface, and especially a higher-order aberration is largely generated. Alternatively, the power of the negative lens unit disposed on the object side of the prism is excessively weakened, and the total length or the lens diameter of the negative lens unit increases.

On the other hand, if the value of $|r_{1r}/r_{in}|$ is below the lower limit of the condition (7), the negative lens effect of the incidence refractive surface of the prism is relatively excessively weakened. Therefore, the aberration correcting effect is lessened. As a result, the performance is deteriorated or the lens diameter increases, since it becomes difficult to control the entrance pupil position. Alternatively, the power of the negative lens unit disposed on the object side of the prism becomes excessively strong, generation amounts of coma and distortion increase, and the performance is deteriorated.

It is more preferable to satisfy the following condition (7-1):

$$0.1 < |r_{1r}/r_{in}| < 0.8 \quad (7\text{-}1).$$

Moreover, it is preferable that the radius of curvature of the exit refractive surface of the prism satisfies the following condition (8):

$$0.1 < |f_p/r_{out}| < 1.5 \quad (8),$$

wherein $f_p$ denotes the focal length of the positive lens unit, and $r_{out}$ denotes the radius of curvature of the exit refractive surface of the prism.

If the value of $|f_p/r_{out}|$ is above the upper limit of the condition (8), the positive lens effect of the exit refractive surface of the prism becomes relatively excessively strong. Therefore, spherical aberration is overcorrected in the exit refractive surface, and the performance is deteriorated. Alternatively, the power of the positive lens unit disposed on the image side of the prism is relatively weakened, and it becomes difficult to miniaturize the system.

On the other hand, if the value of $|f_p/r_{out}|$ is below the lower limit of the condition (8), the positive lens effect of the exit refractive surface is relatively excessively weakened, the aberration correcting effect is lessened, and the performance is deteriorated. Alternatively, the power of the positive lens unit disposed on the image side of the prism becomes excessively strong, the generation of spherical aberration and coma increases, and the performance is deteriorated.

It is more preferable to satisfy the following condition (8-1):

$$0.15 < |f_p/r_{out}| < 1.2 \quad (8\text{-}1).$$

Moreover, in the above image forming optical system, it is preferable that refractive indices of all the lenses for use in forming the image satisfy the following condition (9):

$$1.45 < n_{avg} < 1.65 \quad (9),$$

wherein $n_{avg}$ denotes an average value of the refractive indexes of all the lenses for use in forming the image.

If the value of $n_{avg}$ is above the upper limit of the condition (9), the cost of glass increases, and reduction of the cost cannot be expected.

On the other hand, if the value of $n_{avg}$ is below the lower limit of the condition (9), aberrations generated by each lens increase, the performance is deteriorated, and an influence due to a manufacturing error increases.

It is more preferable to satisfy the following condition (9-1):

$$1.5 < n_{avg} < 1.63 \quad (9\text{-}1).$$

It is further preferable to satisfy the following condition (9-2):

$$1.5 < n_{avg} < 1.6 \quad (9\text{-}2).$$

Moreover, in the above image forming optical system, it is preferable that a bending angle of the optical axis by the optical path deflecting element satisfies the following condition (10):

$$70° < \theta < 110° \quad (10),$$

wherein $\theta$ denotes an angle formed by the optical axis of the negative lens unit and that of the positive lens unit.

If the value of $\theta$ is above the upper limit of the condition (10), it becomes difficult to miniaturize the image forming optical system in the thickness direction.

On the other hand, if the value of $\theta$ is below the lower limit of the condition (10), the negative lens unit interferes with the positive lens unit, or it becomes difficult to dispose another member.

It is more preferable to satisfy the following condition (10-1):

$$80° < \theta < 100° \quad (10\text{-}1).$$

Moreover, it is preferable that the above image forming optical system is used in a range of wavelength $\lambda$ which satisfies the following condition (11):

$$600 \text{ nm} < \lambda < 950 \text{ nm} \quad (11).$$

If the value of $\lambda$ is above the upper limit or below the lower limit of the condition (11), the influence of chromatic aberration increases to deteriorate the performance.

It is more preferable to satisfy the following condition (11-1):

650 nm<λ<900 nm    (11-1).

It is further preferable to satisfy the following condition (11-2), 700 nm<λ<850 nm    (11-2).

Numerical examples of the image forming optical system will be described hereinafter with reference to the drawings.

EXAMPLE 1

Figure 2A:
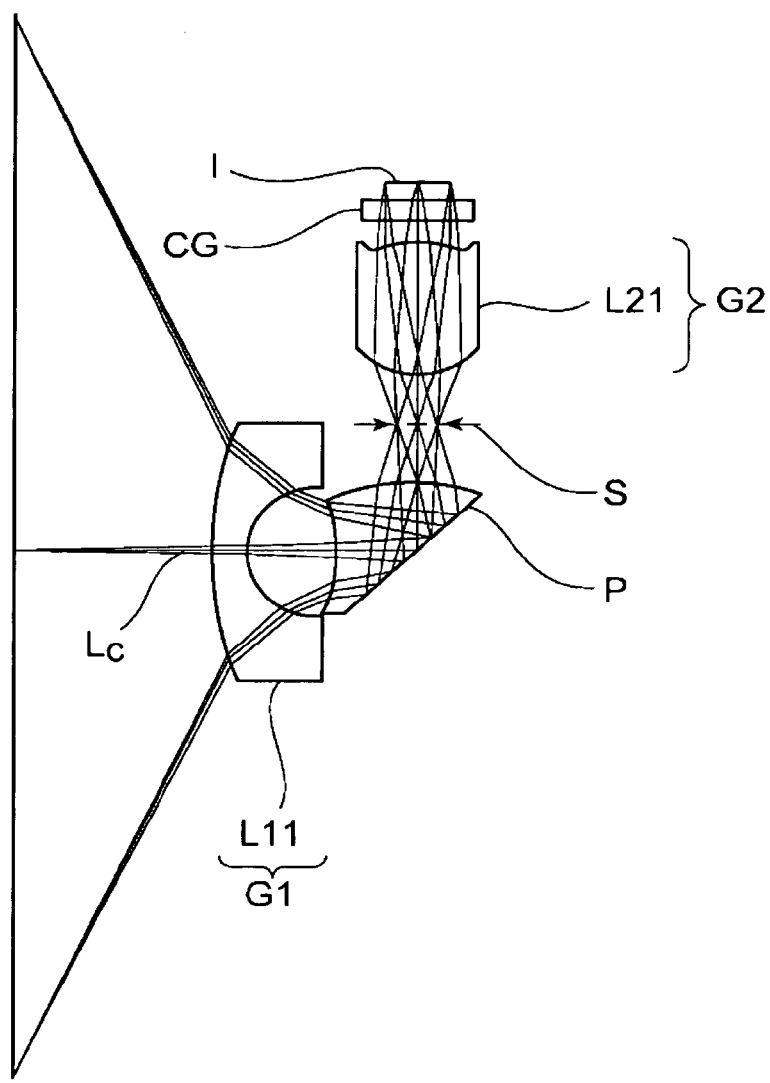
FIG. 2A is a sectional view showing Example 1 in a state in which the optical axis is bent.

FIG. 1 is a sectional view showing Example 1 of the image forming optical system of the present invention in a state in which the optical axis is straightened. FIG. 2A is a sectional view showing Example 1 in a state in which the optical axis is bent. FIGS. 3 and 4 are aberration diagrams at a time when the image forming optical system is focused on an infinite object in Example 1, SA denotes spherical aberration, FC denotes astigmatism, and DT denotes distortion, respectively. FIG. 3 shows aberration diagram for the wavelength of 860 nm, and FIG. 4 shows aberration diagram for the wavelength of 760 nm.

As shown in FIGS. 1 and 2A, Example 1 is constituted of a negative lens unit G1, a prism P and a positive lens unit G2 in order from an object side toward an image pickup surface I. In the drawing, S denotes an aperture stop, CG denotes cover glass, I denotes the image pickup surface of an image sensor, and $L_C$ denotes the optical axis of the image forming optical system.

The negative lens unit G1 is constituted of a negative meniscus lens L11 as a first lens directing its convex surface toward the object side.

Figure 2B:
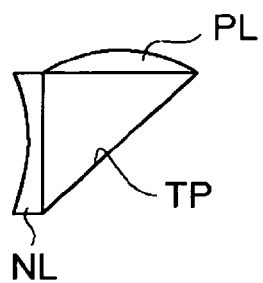
FIG. 2B and FIG. 2C show examples of a reflecting member or an optical path deflecting element which may be used in the image forming optical system of the present invention.
Figure 2C:
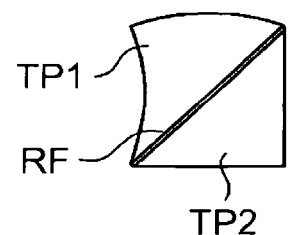

The prism P has an incidence refractive surface which is a concave aspherical surface on the object side, a reflective surface, and an exit refractive surface which is a convex surface toward an image side. This prism P serves as a reflecting member of an optical path deflecting element. FIG. 2B and FIG. 2C show another examples of the reflecting member or the optical path deflecting element. In FIG. 2B, the reflecting member or the optical path deflecting element is formed by cementing a negative lens NL and a positive lens PL to a triangular prism TP. In FIG. 2C, the reflecting member or the optical path deflecting element is formed by cementing a triangular prism TP2 and a deformed triangular prism TP1 with a dielectric multi-layer thin film having a high reflectivity between them.

The positive lens unit G2 is disposed on the side of the image pickup surface I of the prism P with the aperture stop S being held between the positive lens unit and the prism, and constituted of a positive lens L21 as a second lens having a double-convex shape in the area on or near the optical axis (central portion of the lens). The curvature of the image-side surface of the positive lens L21 differs in the central portion and in the area around the central portion.

Aspherical surfaces are used in the incidence refractive surface of the prism P and the opposite surfaces of the positive lens L21, respectively.

Moreover, the prism P and the positive lens L21 are made of amorphous-polyolefin-based ZEONEX® (ZEON Corporation).

Next, numerical data of Example 1 will be described hereinafter.

In the numerical data, $r_1$, $r_2$ . . . denote radii (mm) of curvature of the surfaces of optical members, $d_1$, $d_2$ . . . denote thicknesses of the optical members or spaces (mm) between the optical members, $n_{d1}$, $n_{d2}$ . . . denote refractive indices of the optical members for the wavelength (587.6 nm) of a d-line, and $v_{d1}$, $V_{d2}$ . . . denote Abbe numbers of the optical members for the wavelength (587.6 nm) of d-line. Symbol (OB) means that the surface is an object surface, (AS) means that the surface is an aspherical surface, (R) means that the surface is a reflective surface, (S) means that the surface is an aperture stop, and (I) means that the surface is an image pickup surface, respectively. Symbol Ih denotes the maximum image height, and is equal to a half of the diagonal length of the effective image pickup region of the image sensor. Symbol FL denotes the focal length of the image forming optical system, Fno denotes the F number, and Oh denotes the maximum object height.

Moreover, an aspherical shape rotatably symmetric with respect to the optical axis is defined by the following equation in the coordinate system in which the optical axis direction is a z-axis, a direction crossing the optical axis at right angles is a y-axis, and a direction crossing the z-axis and the y-axis at right angles is an x-axis:

$$z=(y^2/r)/[1+[1\cdot(1+k)(y/r)^2]^{1/2}]+A_4y^4+A_6y^6+A_8y^8+A_{10}y^{10},$$

wherein k denotes a conic constant, and $A_4$, $A_6$, $A_8$ and $A_{10}$ are 4th-order, 6th-order, 8th-order and 10th-order aspherical coefficients.

It is to be noted that these symbols are common to numerical data of Examples 2 to 8 described later.

Numerical Data 1
Ih: 0.987 mm FL: 0.633 mm Fno: 2.400 Oh: 25.00 mm

| | | | |
|---|---|---|---|
| $r_0 = \infty$(OB) | $d_0 = 5.00$ | | |
| $r_1 = 10.088$ | $d_1 = 1.00$ | $n_{d1} = 1.78590$ | $v_{d1} = 44.20$ |
| $r_2 = 1.867$ | $d_2 = 2.25$ | | |
| $r_3 = -2.829$ (AS) | $d_3 = 2.00$ | $n_{d3} = 1.52542$ | $v_{d3} = 55.78$ |
| $r_4 = \infty$ (R) | $d_4 = 2.00$ | $n_{d4} = 1.52542$ | $v_{d4} = 55.78$ |
| $r_5 = -5.273$ | $d_5 = 1.67$ | | |
| $r_6 = \infty$ (S) | $d_6 = 1.41$ | | |
| $r_7 = 1.876$(AS) | $d_7 = 3.63$ | $n_{d7} = 1.52542$ | $v_{d7} = 55.78$ |
| $r_8 = -1.590$ (AS) | $d_8 = 0.59$ | | |
| $r_9 = \infty$ | $d_9 = 0.50$ | $n_{d9} = 1.51633$ | $v_{d9} = 64.14$ |
| $r_{10} = \infty$ | $d_{10} = 0.47$ | | |
| $r_{11} = \infty$ (I) | | | |

Aspherical coefficient

| Surface No. | k | $A_4$ | $A_6$ | $A_8$ | $A_{10}$ |
|---|---|---|---|---|---|
| 3 | −5.527 | −1.99081 × 10⁻³ | 1.35735 × 10⁻³ | | |
| 7 | −1.132 | 2.10816 × 10⁻³ | 4.64410 × 10⁻³ | | |
| 8 | 0.224 | 1.19891 × 10⁻¹ | 6.69058 × 10⁻² | −7.04458 × 10⁻² | 3.68355 × 10⁻² |

EXAMPLE 2

Figure 5:
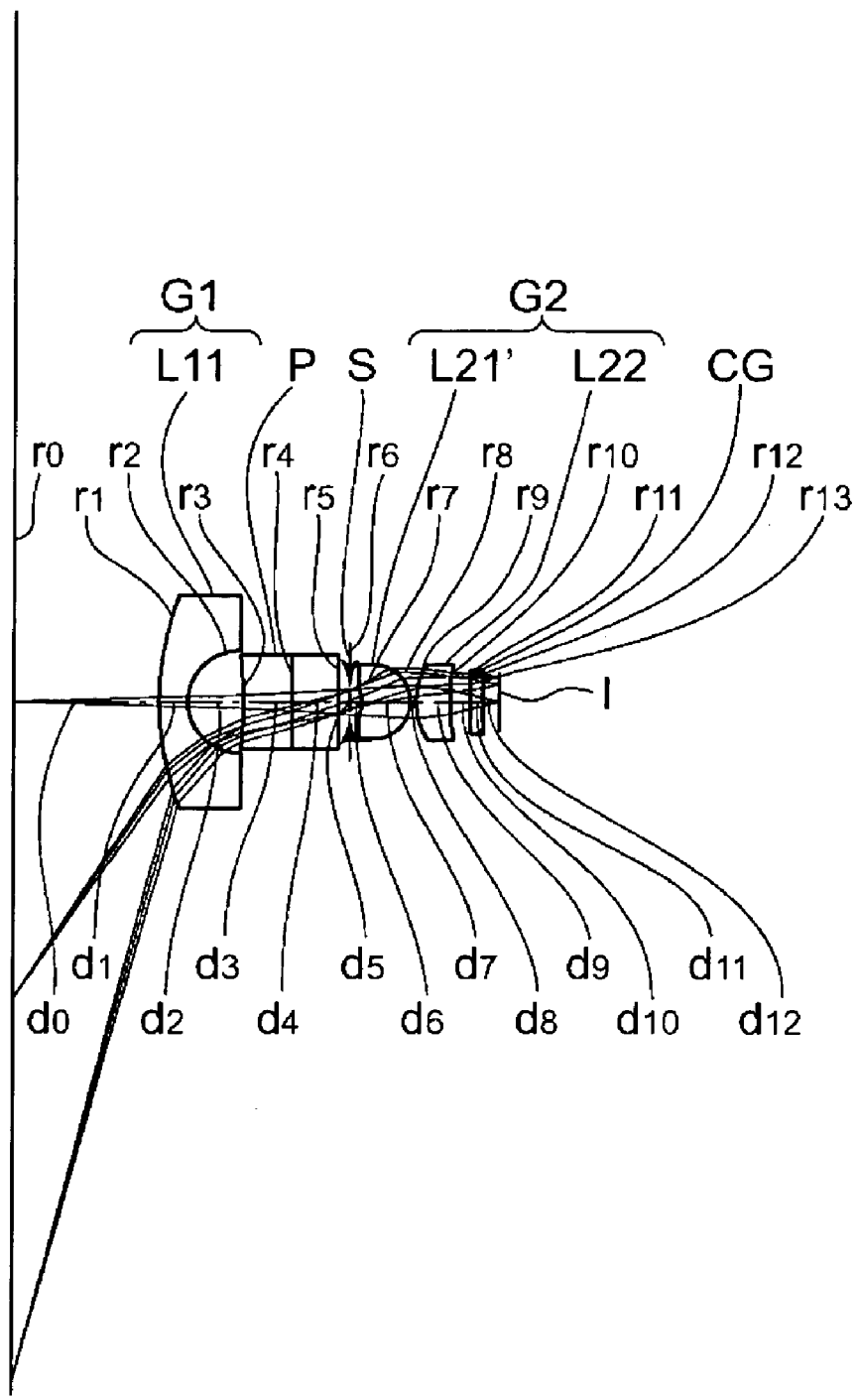
FIG. 5 is a sectional view showing Example 2 of the image forming optical system of the present invention in a state in which an optical axis is straightened.
Figure 6:
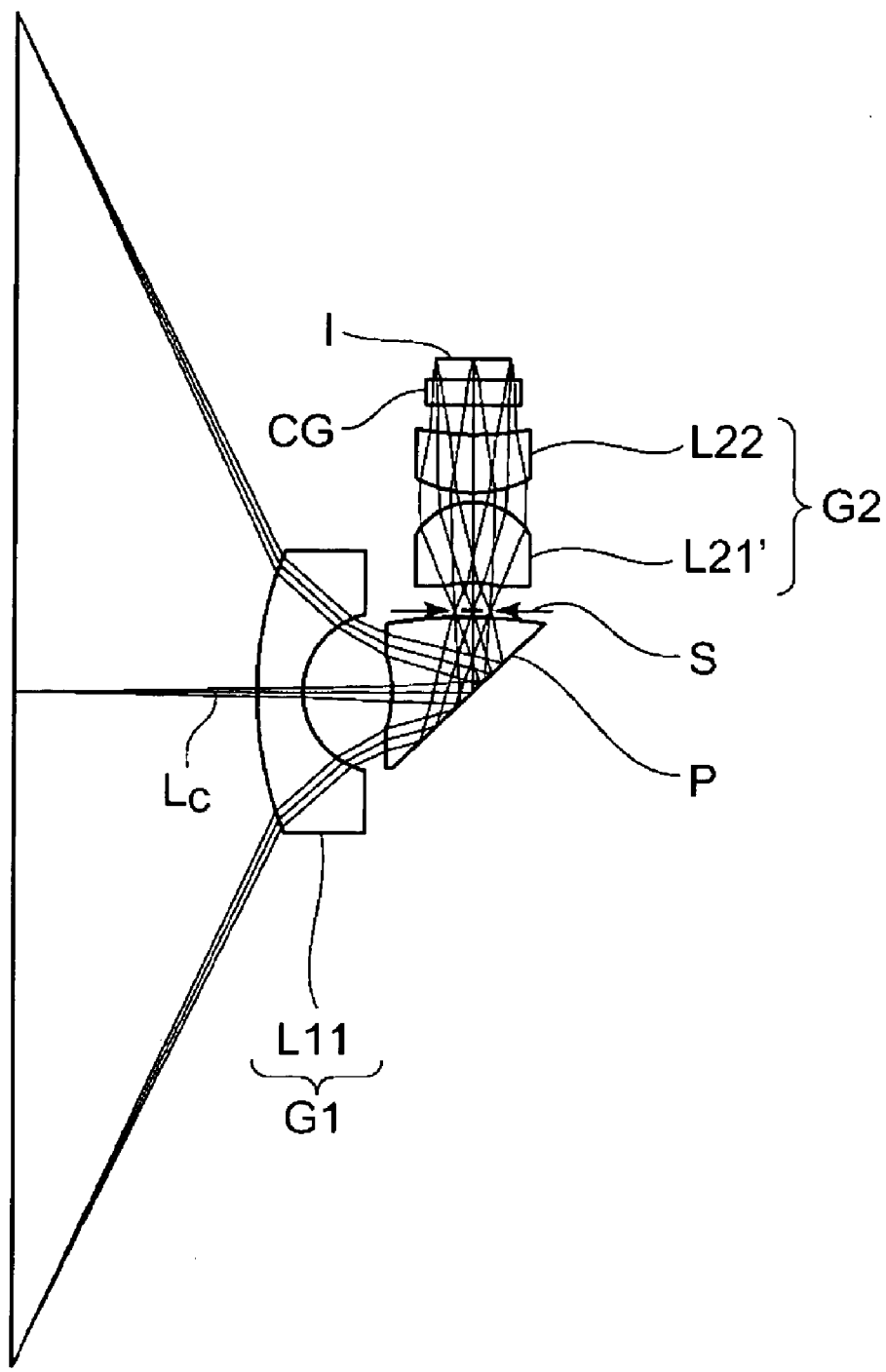
FIG. 6 is a sectional view showing Example 2 in a state in which the optical axis is bent.
Figure 7:
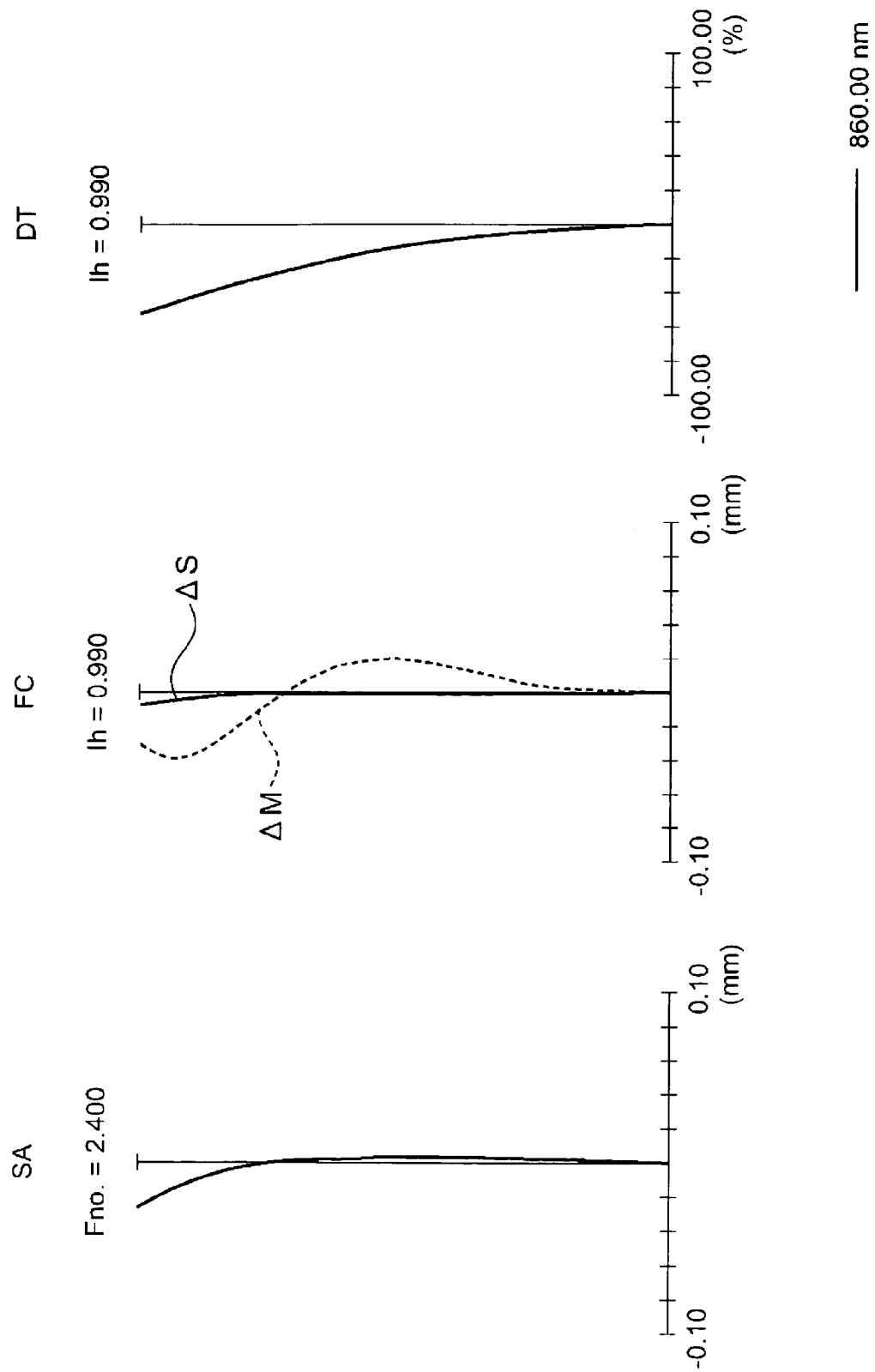
FIG. 7 is an aberration diagram at a time when a wavelength of light for use is set to 860 nm and the image forming optical system is focused on an infinite object in Example 2, SA denotes a spherical aberration, FC denotes an astigmatism, and DT denotes a distortion, respectively.
Figure 8:
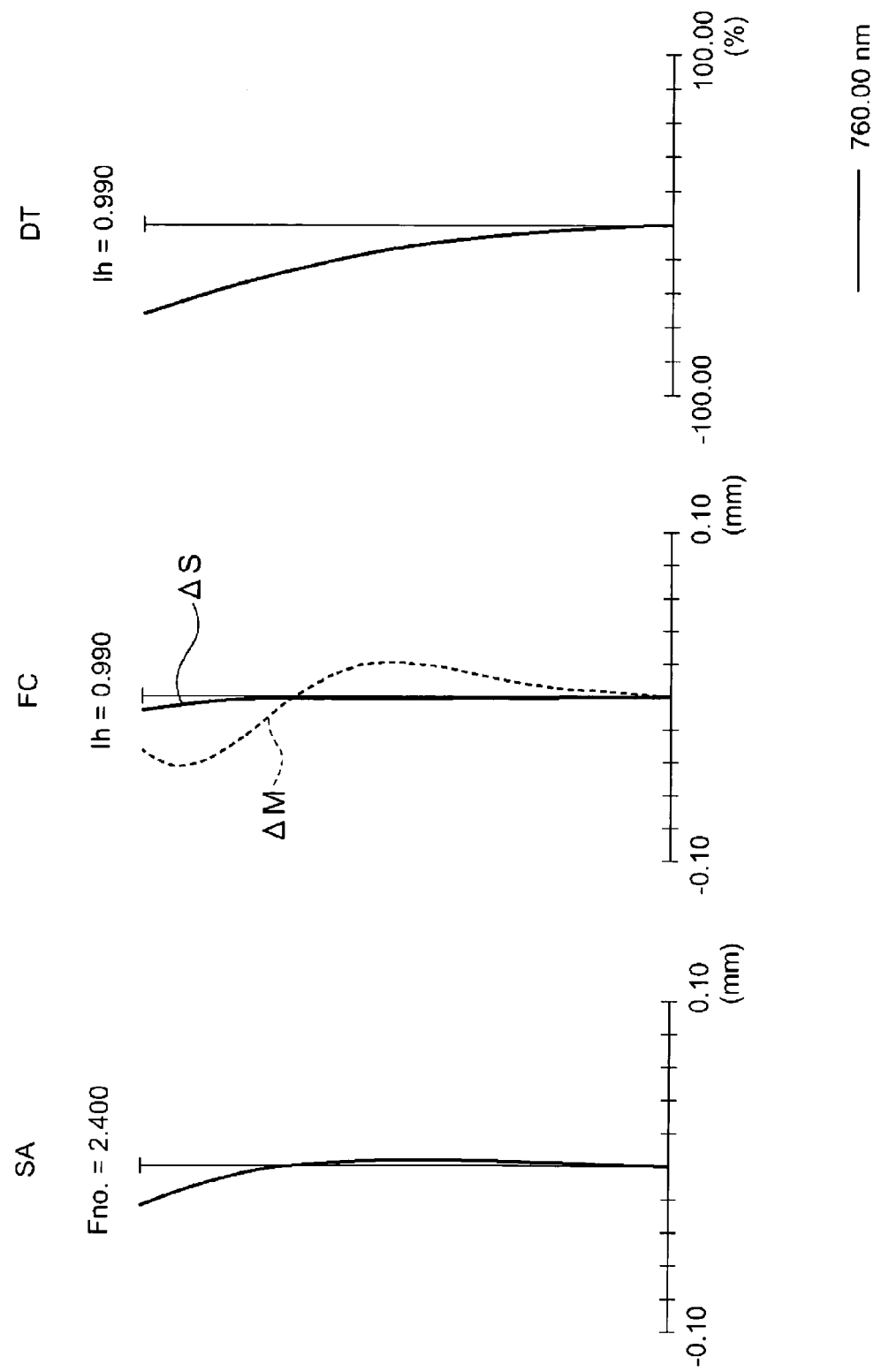
FIG. 8 is an aberration diagram at a time when a wavelength of light for use is set to 760 nm and the image forming optical system is focused on an infinite object in Example 2, SA denotes a spherical aberration, FC denotes an astigmatism, and DT denotes a distortion, respectively.

FIG. 5 is a sectional view showing Example 2 in a state in which the optical axis is straightened. FIG. 6 is a sectional view showing Example 2 in a state in which the optical axis is bent. FIGS. 7 and 8 are aberration diagrams at a time when the image forming optical system is focused on an infinite object in Example 2, SA denotes spherical aberration, FC denotes astigmatism, and DT denotes distortion, respectively. FIG. 7 shows aberration diagram for the wavelength of 860 nm, and FIG. 8 shows aberration diagram for the wavelength of 760 nm.

As shown in FIGS. 5 and 6, Example 2 is constituted of a negative lens unit G1, a prism P and a positive lens unit G2 in order from an object side toward an image pickup surface I. In the drawing, S denotes an aperture stop, CG denotes cover glass, I denotes the image pickup surface, and $L_C$ denotes the optical axis of the image forming optical system.

The negative lens unit G1 is constituted of a negative meniscus lens L11 as a first lens directing its convex surface toward the object side.

The prism P has an incidence refractive surface which is a concave aspherical surface on the object side, a reflective surface, and an exit refractive surface which is a convex surface toward the image side.

The positive lens unit G2 is disposed on the side of the image pickup surface I of the prism P with the aperture stop S being held between the positive lens unit and the prism, and constituted of, in order from the object side, a positive meniscus lens L21' as a second lens directing its convex surface toward the image side, and a positive meniscus lens L22 as a third lens directing its convex surface toward the object side.

Aspherical surfaces are used in the incidence refractive surface of the prism P, the opposite surfaces of the positive meniscus lens L21', and the image-side surface of the positive meniscus lens L22, respectively.

Moreover, the prism P, the positive meniscus lens L21' and the positive meniscus lens L22 are made of amorphous-polyolefin-based ZEONEX® (ZEON Corporation).

Next, numerical data of Example 2 will be described hereinafter.

EXAMPLE 2

Ih: 0.990 mm FL: 0.633 mm Fno: 2.400 Oh: 25.00 mm

| | | | |
|---|---|---|---|
| $r_0 = \infty$ (OB) | $d_0 = 5.00$ | | |
| $r_1 = 9.659$ | $d_1 = 1.00$ | $n_{d1} = 1.78590$ | $v_{d1} = 44.20$ |
| $r_2 = 1.803$ | $d_2 = 1.92$ | | |
| $r_3 = -4.433$ (AS) | $d_3 = 1.70$ | $n_{d3} = 1.52542$ | $v_{d3} = 55.78$ |
| $r_4 = \infty$ (R) | $d_4 = 1.69$ | $n_{d4} = 1.52542$ | $v_{d4} = 55.78$ |
| $r_5 = -12.356$ | $d_5 = 0.20$ | | |
| $r_6 = \infty$ (S) | $d_6 = 0.56$ | | |
| $r_7 = -8.014$ (AS) | $d_7 = 1.70$ | $n_{d7} = 1.52542$ | $v_{d7} = 55.78$ |
| $r_8 = -1.338$ (AS) | $d_8 = 0.20$ | | |
| $r_9 = 2.431$ | $d_9 = 1.20$ | $n_{d9} = 1.52542$ | $v_{d9} = 55.78$ |
| $r_{10} = 87.556$ (AS) | $d_{10} = 0.67$ | | |
| $r_{11} = \infty$ | $d_{11} = 0.50$ | $n_{d11} = 1.51633$ | $v_{d11} = 64.14$ |
| $r_{12} = \infty$ | $d_{12} = 0.47$ | | |
| $r_{13} = \infty$ (I) | | | |

Aspherical coefficient

| Surface No. | k | $A_4$ | $A_6$ | $A_8$ | $A_{10}$ |
|---|---|---|---|---|---|
| 3 | 0.000 | $3.51603 \times 10^{-2}$ | $-1.98452 \times 10^{-3}$ | | |
| 7 | 0.000 | $-1.95001 \times 10^{-1}$ | $1.45796 \times 10^{-3}$ | | |
| 8 | 0.000 | $-2.20193 \times 10^{-2}$ | $7.23950 \times 10^{-3}$ | $-6.18380 \times 10^{-3}$ | $8.75043 \times 10^{-3}$ |
| 10 | 0.000 | $9.81131 \times 10^{-2}$ | $4.15516 \times 10^{-3}$ | $-1.51055 \times 10^{-2}$ | |

EXAMPLE 3

Figure 9:
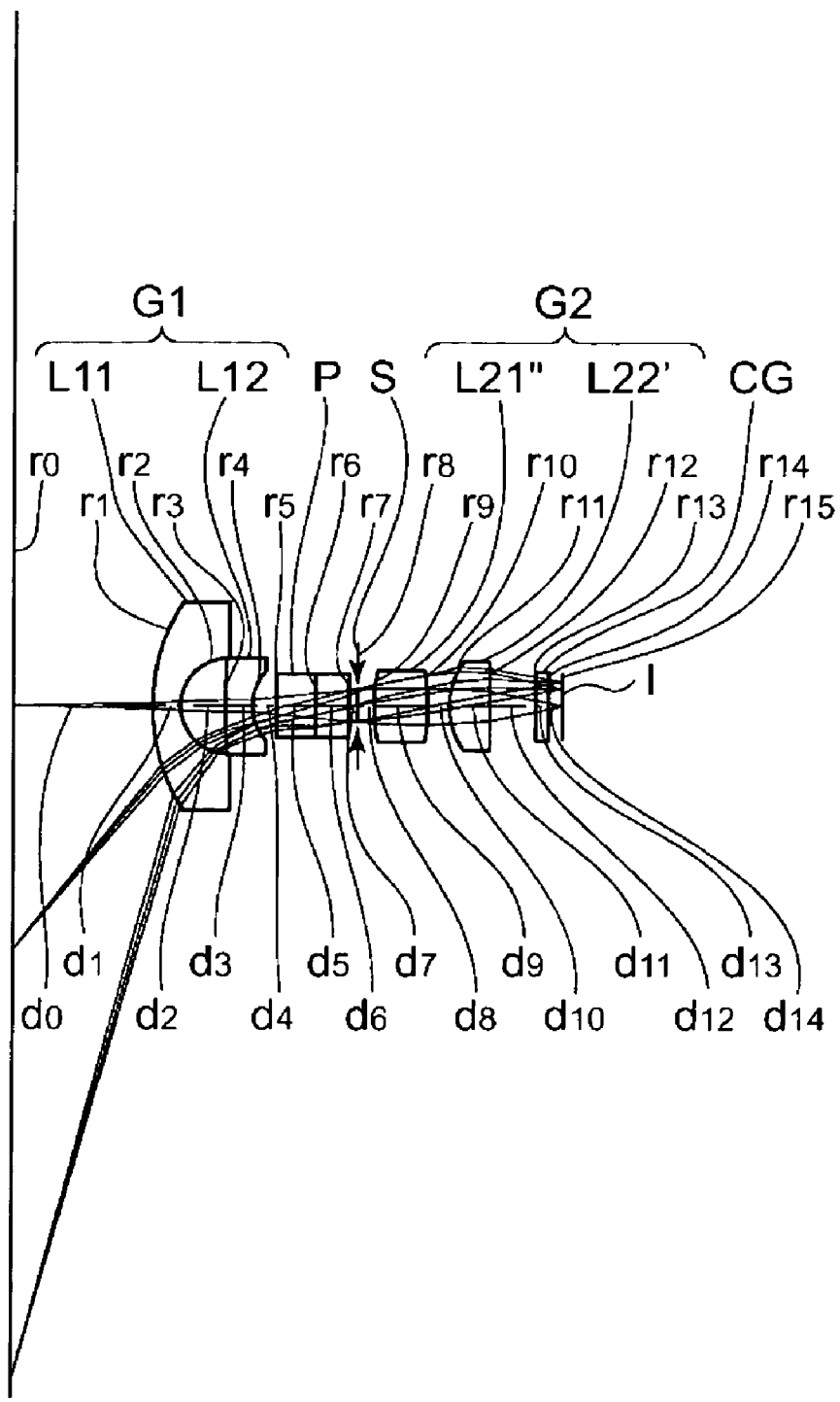
FIG. 9 is a sectional view showing Example 3 of the image forming optical system of the present invention in a state in which an optical axis is straightened.
Figure 10:
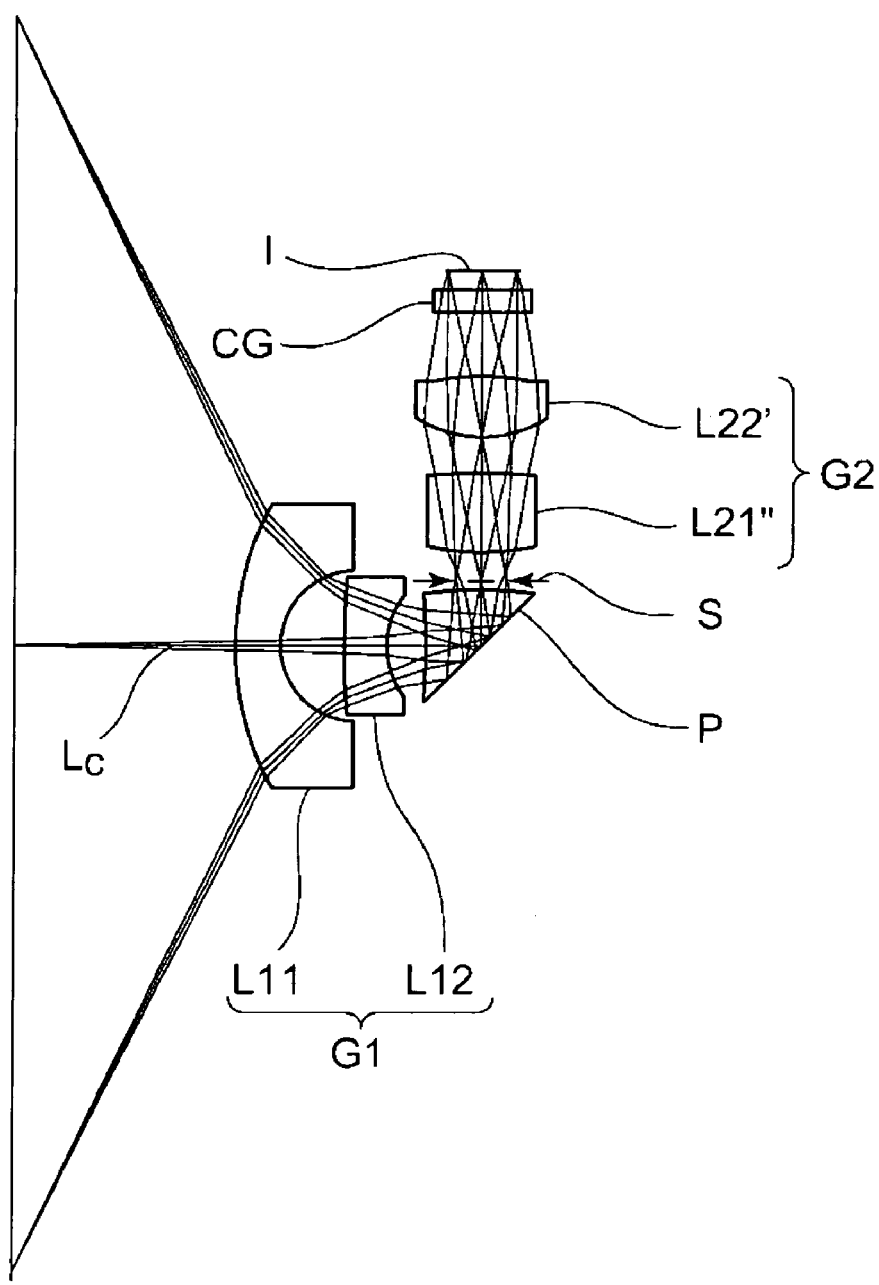
FIG. 10 is a sectional view showing Example 3 in a state in which the optical axis is bent.
Figure 11:
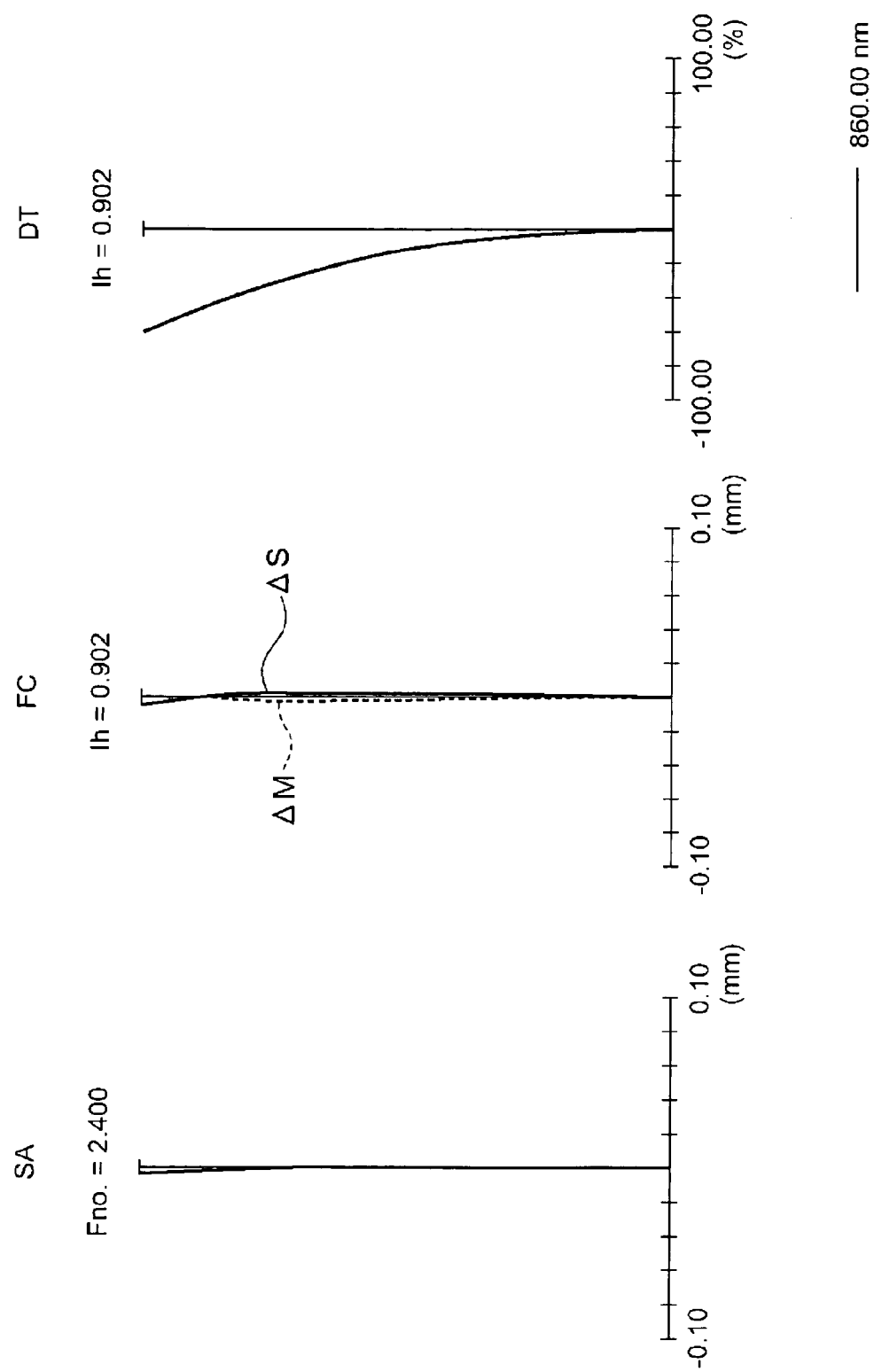
FIG. 11 is an aberration diagram at a time when a wavelength of light for use is set to 860 nm and the image forming optical system is focused on an infinite object in Example 3, SA denotes a spherical aberration, FC denotes an astigmatism, and DT denotes a distortion, respectively.
Figure 12:
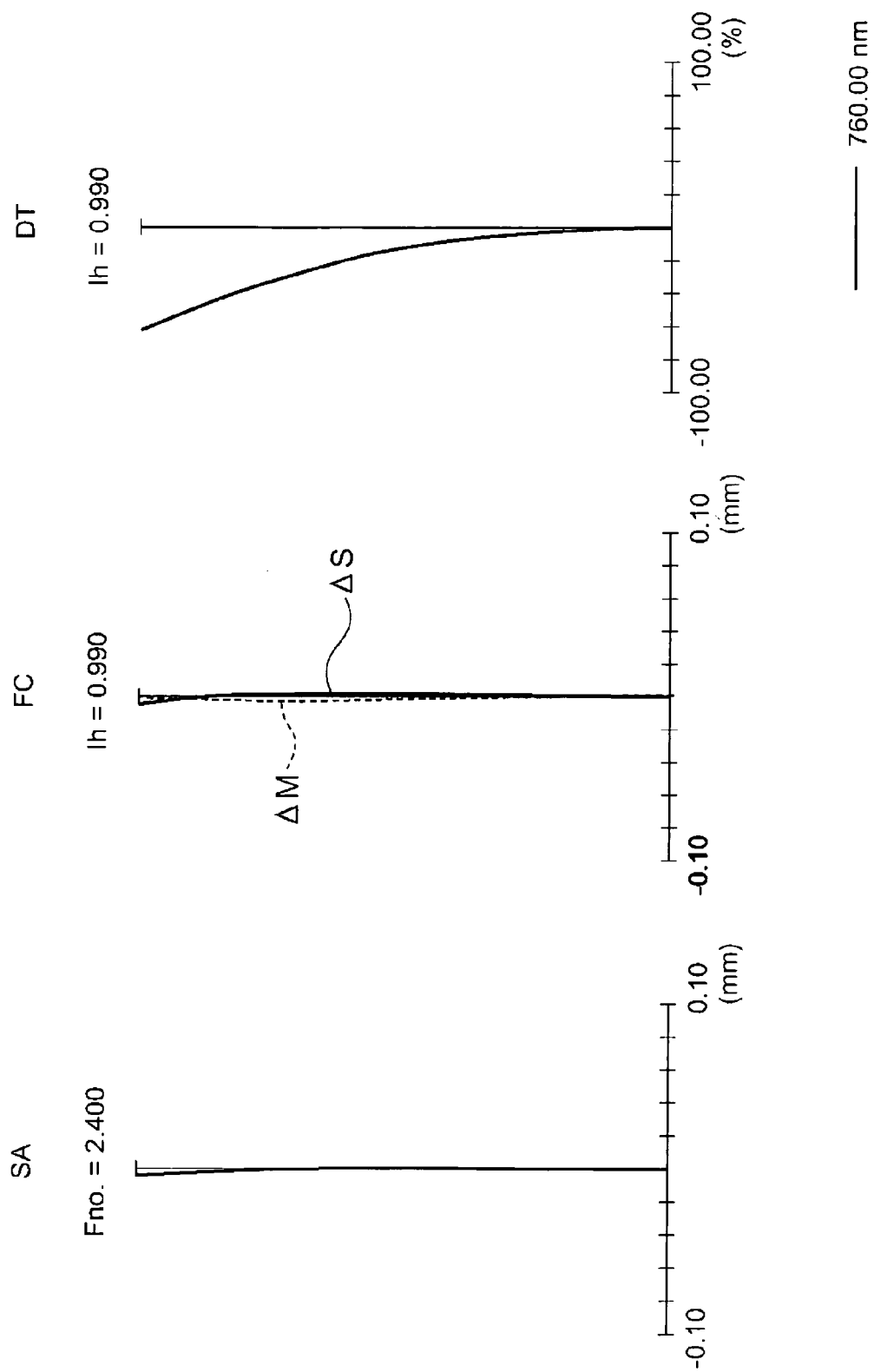
FIG. 12 is an aberration diagram at a time when a wavelength of light for use is set to 760 nm and the image forming optical system is focused on an infinite object in Example 3, SA denotes a spherical aberration, FC denotes an astigmatism, and DT denotes a distortion, respectively.

FIG. 9 is a sectional view showing Example 3 in a state in which the optical axis is straightened. FIG. 10 is a sectional view showing Example 3 in a state in which the optical axis is bent. FIGS. 11 and 12 are aberration diagrams at a time when the image forming optical system is focused on an infinate object in Example 3, SA denotes spherical aberration, FC denotes astigmatism, and DT denotes distortion, respectively. FIG. 11 shows a case where the wavelength of the light is 860 nm, and FIG. 12 shows a case where the wavelength of the light is 760 nm.

As shown in FIGS. 9 and 10, Example 3 is constituted of a negative lens unit G1, a prism P and a positive lens unit G2 in order from an object side toward an image pickup surface I. In the drawing, S denotes an aperture stop, CG denotes cover glass, I denotes the image pickup surface, and Lc denotes the optical axis of the image forming optical system.

The negative lens unit G1 is constituted of, in order from the object side, a negative meniscus lens L11 as a first lens directing its convex surface toward the object side, and a negative meniscus lens L12 as a second lens directing its convex surface toward the object side.

The prism P has an incidence refractive surface which is a concave surface on the object side, a reflective surface, and an exit refractive surface which is a convex surface toward the image side.

The positive lens unit G2 is disposed on the side of the image pickup surface I of the prism P with the aperture stop S being held between the positive lens unit and the prism, and constituted of, in order from the object side, a positive lens L21" as a third lens having a double-convex shape, and a positive lens L22' as a fourth lens having a double-convex shape in the central portion of the lens.

Aspherical surfaces are used in the opposite surfaces of the positive lens L22', respectively.

Moreover, the positive lens L22' is made of amorphous-polyolefin-based ZEONEX® (ZEON Corporation).

Next, numerical data of Example 3 will be described hereinafter.

EXAMPLE 3

| Ih: 0.902 mm FL: 0.719 mm Fno: 2.400 Oh: 25.00 mm | | | |
|---|---|---|---|
| $r_0 = \infty$ (OB) | $d_0 = 5.00$ | | |
| $r_1 = 7.144$ | $d_1 = 1.00$ | $n_{d1} = 1.78590$ | $v_{d1} = 44.20$ |
| $r_2 = 1.728$ | $d_2 = 1.50$ | | |
| $r_3 = 12.292$ | $d_3 = 1.00$ | $n_{d3} = 1.60311$ | $v_{d3} = 60.64$ |
| $r_4 = 1.908$ | $d_4 = 0.90$ | | |
| $r_5 = -8.165$ | $d_5 = 1.30$ | $n_{d5} = 1.60311$ | $v_{d5} = 60.64$ |
| $r_6 = \infty$ (R) | $d_6 = 1.30$ | $n_{d6} = 1.60311$ | $v_{d6} = 60.64$ |
| $r_7 = -7.453$ | $d_7 = 0.20$ | | |
| $r_8 = \infty$ (S) | $d_8 = 0.68$ | | |
| $r_9 = 5.599$ | $d_9 = 1.87$ | $n_{d9} = 1.60311$ | $v_{d9} = 60.64$ |
| $r_{10} = -9.083$ | $d_{10} = 0.81$ | | |
| $r_{11} = 2.470$ (AS) | $d_{11} = 1.50$ | $n_{d11} = 1.52542$ | $v_{d11} = 55.78$ |
| $r_{12} = -4.657$ (AS) | $d_{12} = 1.57$ | | |
| $r_{13} = \infty$ | $d_{13} = 0.50$ | $n_{d13} = 1.51633$ | $v_{d13} = 64.14$ |
| $r_{14} = \infty$ | $d_{14} = 0.45$ | | |
| $r_{15} = \infty$ (I) | | | |

| Aspherical coefficient | | | | | |
|---|---|---|---|---|---|
| Surface No. | k | $A_4$ | $A_6$ | $A_8$ | $A_{10}$ |
| 11 | 0.000 | $-7.62116 \times 10^{-3}$ | $-2.23578 \times 10^{-4}$ | $8.68256 \times 10^{-4}$ | $-1.98761 \times 10^{-4}$ |
| 12 | 0.000 | $1.69860 \times 10^{-2}$ | $-1.51621 \times 10^{-3}$ | $1.92114 \times 10^{-3}$ | $-3.73340 \times 10^{-4}$ |

EXAMPLE 4

Figure 13:
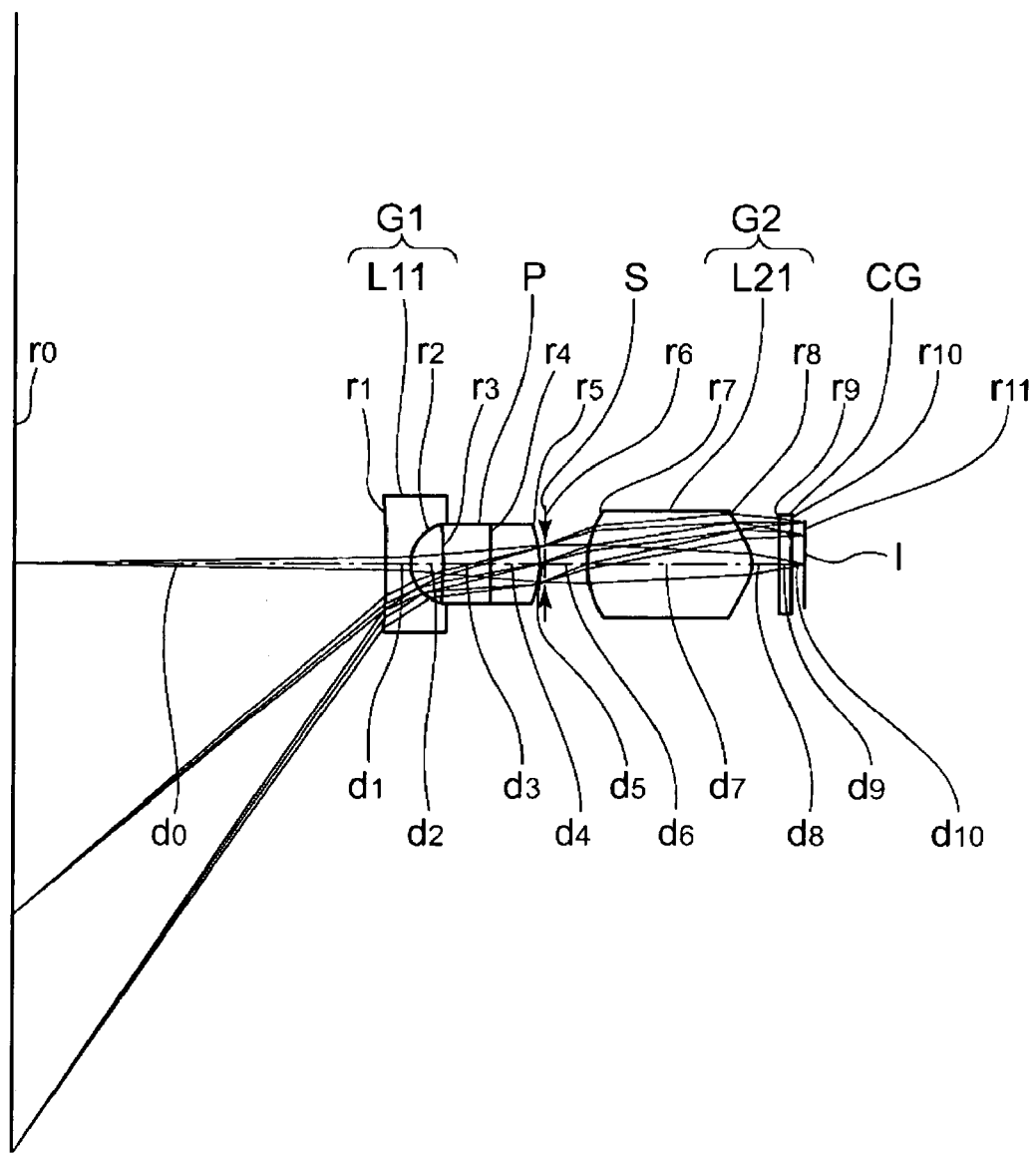
FIG. 13 is a sectional view showing Example 4 of the image forming optical system of the present invention in a state in which an optical axis is straightened.
Figure 14:
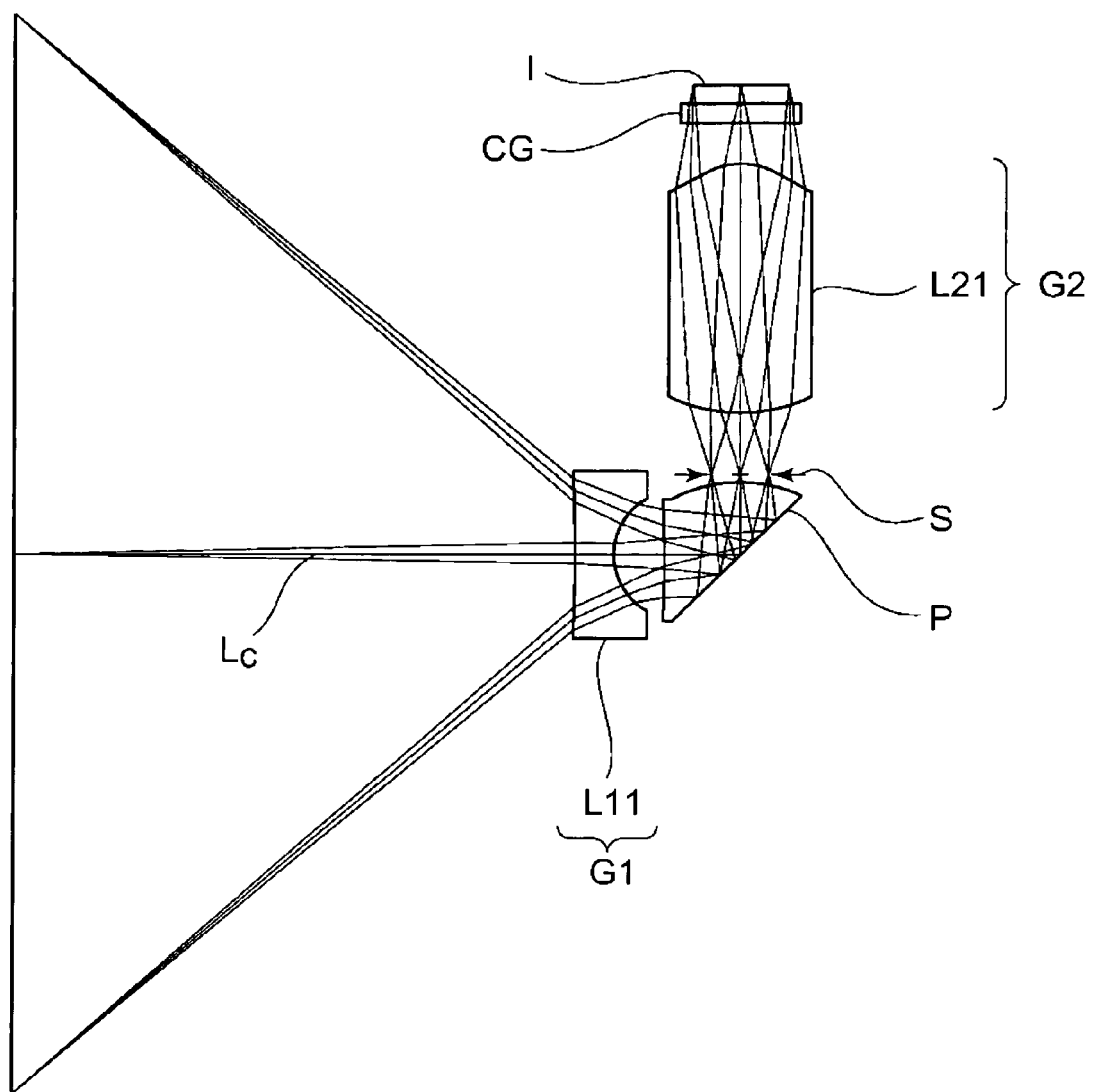
FIG. 14 is a sectional view showing Example 4 in a state in which the optical axis is bent.
Figure 15:
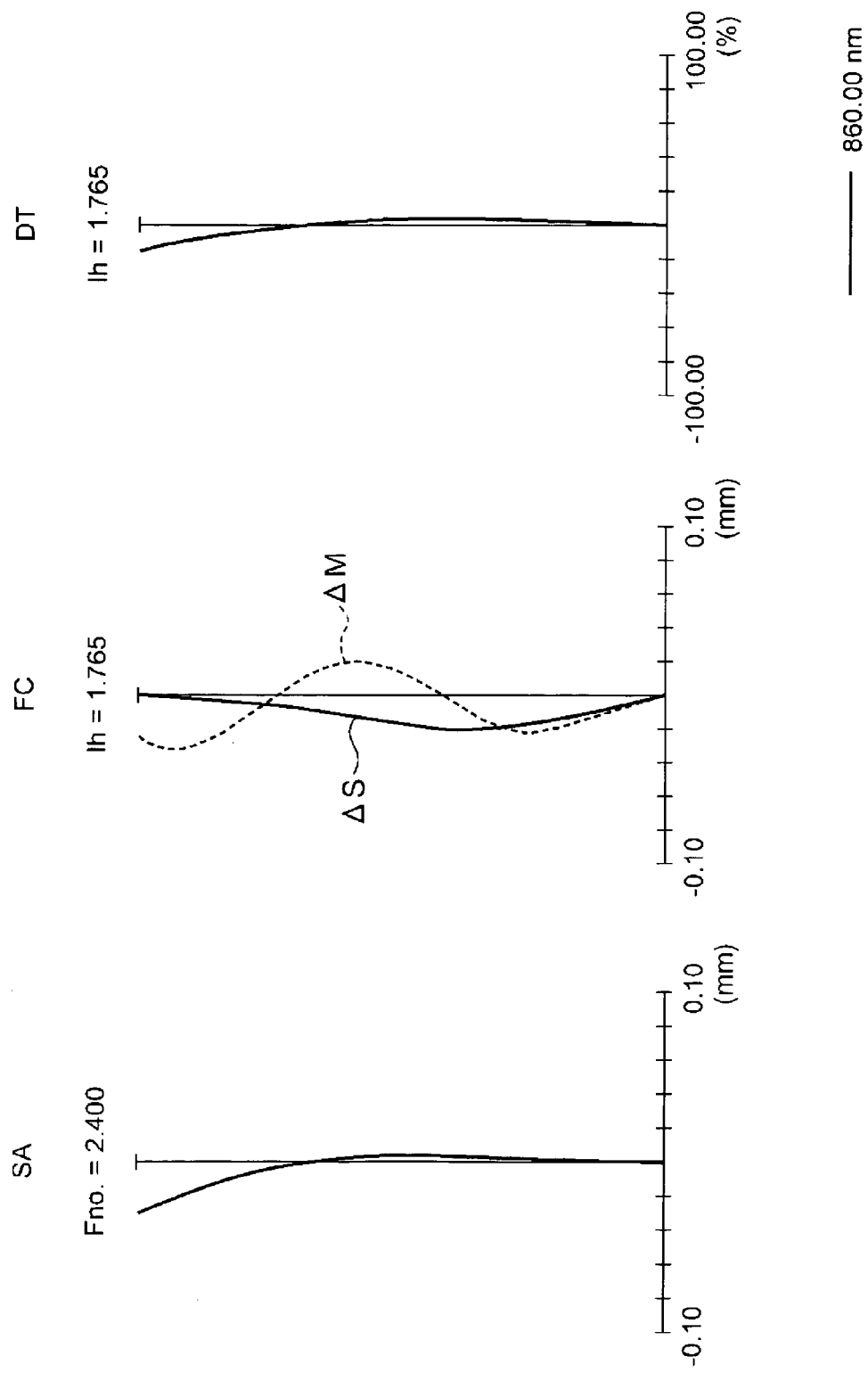
FIG. 15 is an aberration diagram at a time when a wavelength of light for use is set to 860 nm and the image forming optical system is focused on an infinite object in Example 4, SA denotes a spherical aberration, FC denotes an astigmatism, and DT denotes a distortion, respectively.
Figure 16:
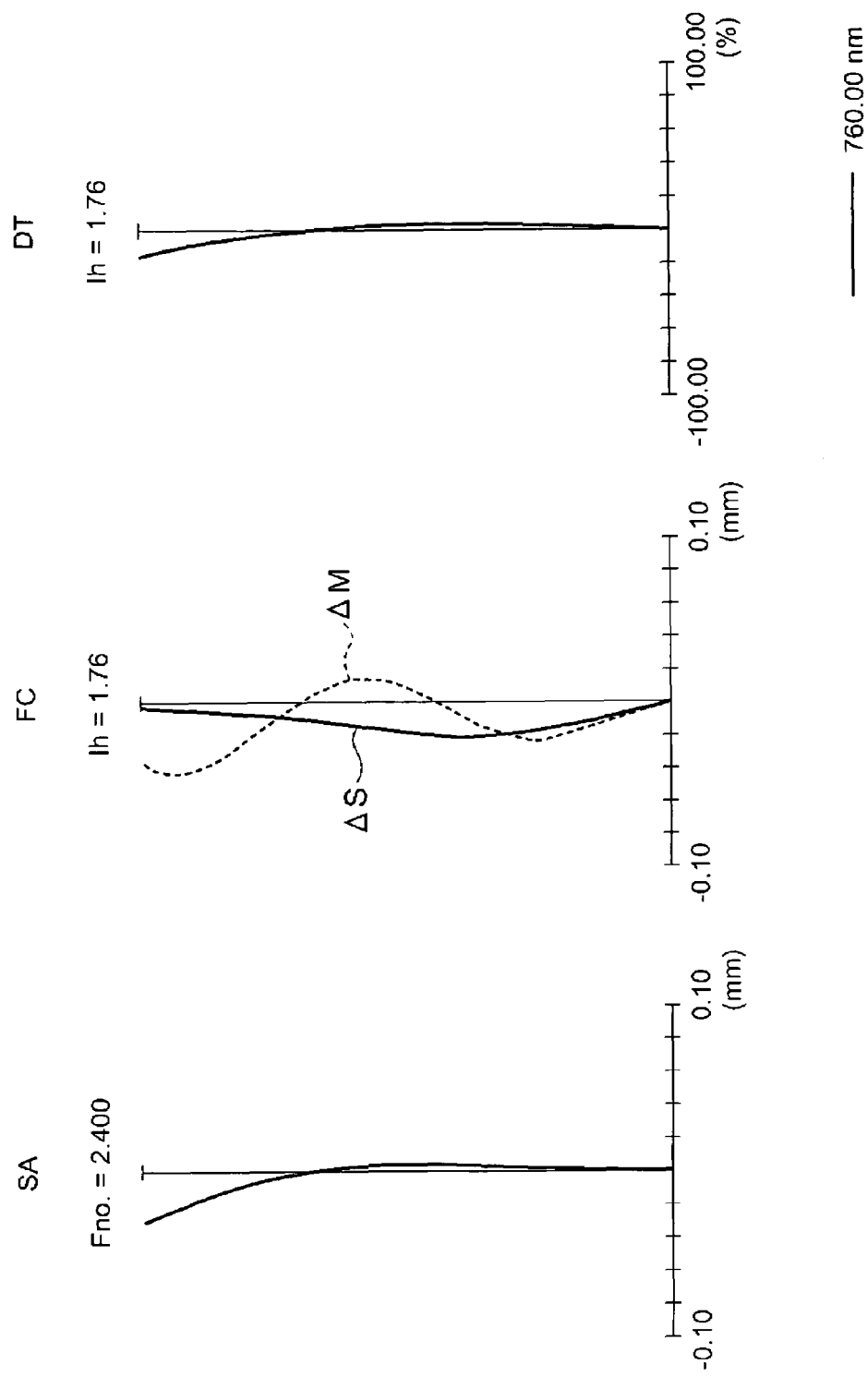
FIG. 16 is an aberration diagram at a time when a wavelength of light for use is set to 760 nm and the image forming optical system is focused on an infinite object in Example 4, SA denotes a spherical aberration, FC denotes an astigmatism, and DT denotes a distortion, respectively.

FIG. 13 is a sectional view showing Example 4 in a state in which the optical axis is straightened. FIG. 14 is a sectional view showing Example 4 in a state in which the optical axis is bent. FIGS. 15 and 16 are aberration diagrams at a time when the image forming optical system is focused on an infinite object in Example 4, SA denotes spherical aberration, FC denotes astigmatism, and DT denotes distortion, respectively. FIG. 15 shows a case where the wavelength of the light is 860 nm, and FIG. 16 shows the case where the wavelength of the light is 760 nm.

As shown in FIGS. 13 and 14, Example 4 is constituted of a negative lens unit G1, a prism P and a positive lens unit G2 in order from an object side toward an image pickup surface I. In the drawing, S denotes an aperture stop, CG denotes cover glass, I denotes the image pickup surface, and Lc denotes the optical axis of the image forming optical system.

The negative lens unit G1 is constituted of a negative lens L11 as a first lens having a double-concave shape.

The prism P has an incidence refractive surface which is a concave aspherical surface on the object side, a reflective surface, and an exit refractive surface which is a convex surface toward the image side.

The positive lens unit G2 is disposed on the side of the image pickup surface I of the prism P with the aperture stop S being held between the positive lens unit and the prism, and constituted of a positive lens L21 as a second lens having a double-convex shape in the central portion of the lens.

Aspherical surfaces are used in the incidence refractive surface of the prism P and the opposite surfaces of the positive lens L21, respectively.

Moreover, the prism P and the positive lens L21 are made of amorphous-polyolefin-based ZEONEX® (ZEON Corporation).

Next, numerical data of Example 4 will be described hereinafter.

EXAMPLE 4

| Ih: 1.765 mm FL: 1.5 mm Fno: 2.400 Oh: 25.00 mm | | | |
|---|---|---|---|
| $r_0 = \infty$ (OB) | $d_0 = 15.0$ | | |
| $r_1 = -42.268$ | $d_1 = 1.00$ | $n_{d1} = 1.51633$ | $v_{d1} = 64.14$ |
| $r_2 = 1.743$ | $d_2 = 1.38$ | | |
| $r_3 = -9.496$ (AS) | $d_3 = 2.00$ | $n_{d3} = 1.52542$ | $v_{d3} = 55.78$ |
| $r_4 = \infty$ (R) | $d_4 = 2.00$ | $n_{d4} = 1.52542$ | $v_{d4} = 55.78$ |
| $r_5 = -3.730$ | $d_5 = 0.20$ | | |
| $r_6 = \infty$ (S) | $d_6 = 1.76$ | | |
| $r_7 = 3.884$ (AS) | $d_7 = 6.78$ | $n_{d7} = 1.52542$ | $v_{d7} = 55.78$ |
| $r_8 = -1.697$ (AS) | $d_8 = 1.13$ | | |

-continued

| Ih: 1.765 mm FL: 1.5 mm Fno: 2.400 Oh: 25.00 mm | | | |
|---|---|---|---|
| $r_9 = \infty$ | $d_9 = 0.50$ | $n_{d9} = 1.51633$ | $v_{d9} = 64.14$ |
| $r_{10} = \infty$ | $d_{10} = 0.45$ | | |
| $r_{11} = \infty$ (I) | | | |

| Aspherical coefficient | | | | |
|---|---|---|---|---|
| Surface No. | k | $A_4$ | $A_6$ | $A_8$ |
| 3 | $-211.088$ | $-1.28544 \times 10^{-3}$ | $2.38331 \times 10^{-3}$ | |
| 7 | $-11.696$ | $1.54380 \times 10^{-2}$ | $-1.52099 \times 10^{-3}$ | |
| 8 | $-1.025$ | $3.73843 \times 10^{-2}$ | $-5.19955 \times 10^{-3}$ | $5.00000 \times 10^{-4}$ |

In the image forming optical systems of Examples 1 to 4 described above, distortion is generated, and each system is constituted to have characteristics similar to those of an f-θ lens. As seen from the aberration diagrams, the system has a satisfactory performance in either of the wavelengths of 860 nm and 760 nm.

It is to be noted that, the lens made of plastic in the above examples may be made of glass. Similarly, the lens made of glass may be made of plastic.

Moreover, when the lens is made of glass having a refractive index higher than that used in each example, higher performance can be achieved. When glass having a refractive index lower than that of each example is used, cost reduction can be achieved.

Furthermore, when special low-dispersion glass is used, a chromatic aberration correcting effect is improved. When a low hygroscopic material (ZEONEX is one example of the material) is used as plastic, performance deterioration due to an environmental change is preferably reduced.

In addition, in each example, to cut unnecessary light such as ghost and flare, in addition to the aperture stop, a flare stop may be disposed. If necessary, the flare stop may be disposed in any place between the object surface and the image forming optical system, between any two optical members in the image forming optical system, or between the image forming optical system and the image surface Moreover, (a part of) a frame for holding the optical member may be constituted so as to cut a flare, or the flare stop may be disposed separately from the frame. The flare stop may be printed or painted directly onto the surface of the optical member, or the flare stop may be formed by bonding a seal on the surface o the optical member. There is not any restriction on a shape of an aperture of the flare stop, and examples of the shape include a circular shape, an elliptic shape, a rectangular shape, a polygonal shape and a shape of a region surrounded with a function curve. Not only a harmful light flux but also a light flux of coma flare in the peripheral portion of the image surface may be cut.

Furthermore, each lens may be coated with an anti-reflection coating to reduce the ghost and the flare. The lens surface, the cover glass or the like may be coated with a coating to cut unnecessary wavelengths of light.

In addition, focusing may be performed in each example. The whole lens system may be moved in the optical axis direction to perform the focusing, or a part of the lenses may be moved to perform the focusing. For example, the lens L21 in FIGS. 2A and 14, the lens L21' and L22 in FIG. 6, or the lens L21" and L22' in FIG. 10 may be moved for focusing.

Moreover, in each example, the position of the micro lenses disposed in front of the image pickup surface of the CCD image sensor may be shifted to prevent brightness in the peripheral portion of the image from being lowered. For example, design of the micro lenses of the CCD image sensor may be changed in accordance with, for example, an incidence angle of the ray at each image height. Furthermore, the lowered brightness in the peripheral portion of the image may be corrected by image processing. Distortion generated in the image forming optical system may be corrected by the image processing.

Next, the following table 1 shows values corresponding to conditions of the above examples. In the table, (860) and (760) indicate that the values correspond to the wavelengths of 860 nm and 760 nm, respectively. When they are not described, the value corresponding to the wavelength of 860 nm is common to the wavelength of 760 nm.

TABLE 1

| Parameter | Example 1 | Example 2 | Example 3 | Example 4 |
|---|---|---|---|---|
| $d_0/Oh$ | 0.20 | 0.20 | 0.20 | 0.60 |
| $fn/fp$ | −1.22 | −1.71 | −0.50 | −0.84 |
| $df/dr$ | 0.60 | 0.83 | 0.90 | 0.41 |
| $fn/Ih$ (860) | −3.18 | −3.08 | −1.52 | −1.51 |
| $fn/Ih$ (760) | −3.16 | −3.06 | −1.51 | −1.84 |
| $Ih/Oh$ | 0.039 | 0.040 | 0.036 | 0.071 |
| $|r_{1r}/r_{in}|$ | 0.66 | 0.15 | 0.21 | 0.18 |
| $|f_p/r_{out}|$ | 0.49 | 0.22 | 0.37 | 1.04 |
| $n_{avg}$ | 1.57950 | 1.58220 | 1.61479 | 1.51586 |
| $\theta$ (degree) | 90.00 | 90.00 | 90.00 | 90.00 |

The image forming optical system of the present invention can be used in an identification apparatus utilizing a fingerprint, iris, voice pattern, face, handwriting, vein (finger, palm or the back of the hand) and the like. One embodiment of the apparatus will be described hereinafter.

Figure 17A:
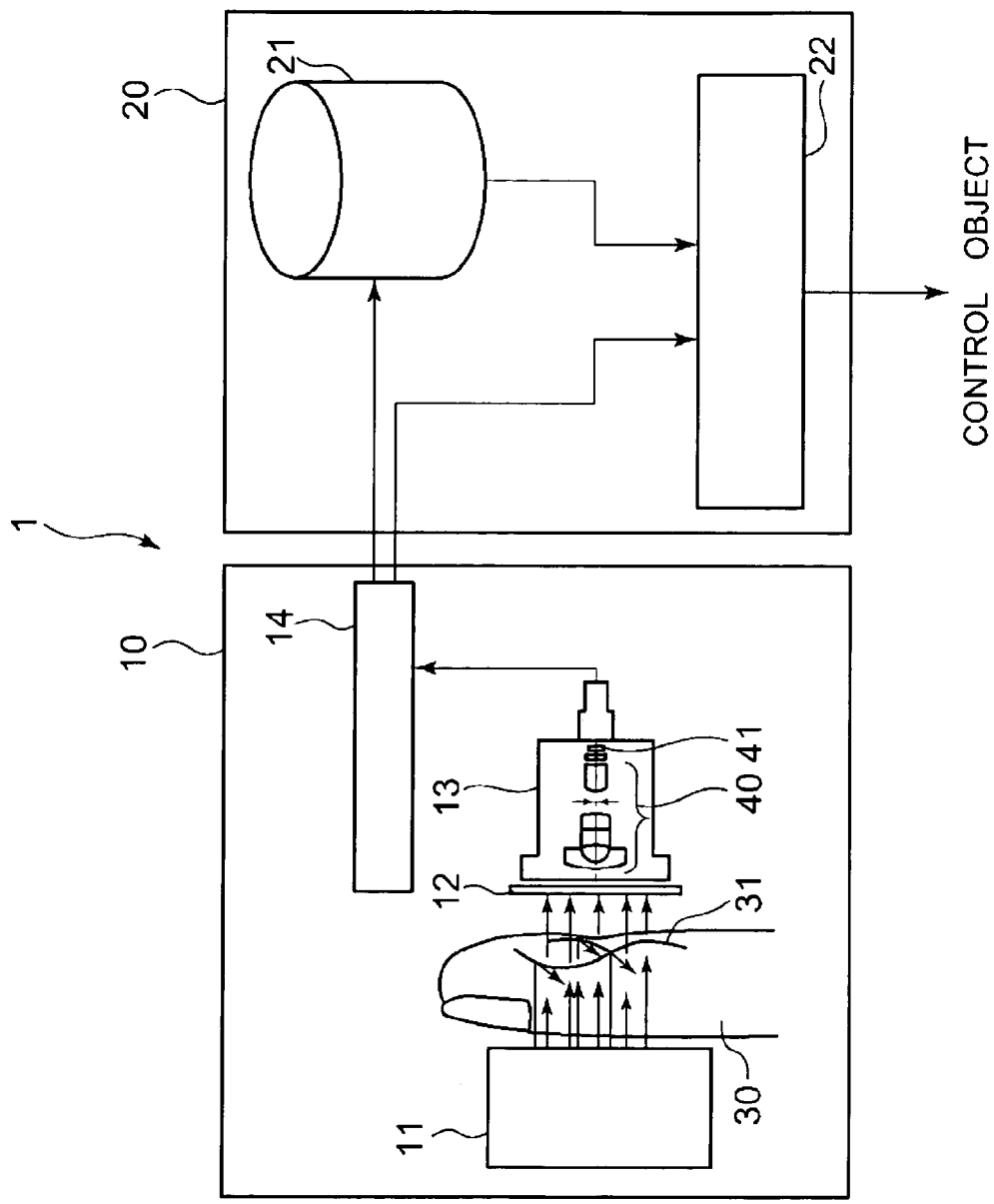
FIG. 17A shows an example in which the image forming optical system of the present invention is applied to a finger vein identification apparatus as an identification apparatus.

FIG. 17A shows an example in which the image forming optical system of the present invention is applied to a finger vein identification apparatus 1 as the identification apparatus. As shown in FIG. 17A, the finger vein identification apparatus 1 is constituted of an image pickup unit 10 and an identification processing unit 20.

The image pickup unit 10 includes: a light source 11 which irradiates a finger 30 as an object with a near-infrared ray; a transparent member 12 on which the finger 30 is to be put; an image pickup apparatus 13; and a vein pattern extracting section 14 which extracts a vein pattern (information inherent in the object) corresponding to a vein 31 from an image picked up by the image pickup apparatus 13. The image pickup apparatus 13 includes: an image forming optical system 40 of, for example, Example 1 of the present invention; and an image sensor 41 disposed on an image side of the image forming optical system, the image sensor being configured to receive light of an object image formed by the image forming optical system 40.

The identification processing unit 20 includes: a registration database 21 which registers the vein pattern as a reference pattern (reference information); and an identification section 22 which collates the vein pattern obtained by the vein pattern extracting section 14 with the reference pattern registered in the registration database 21 to identify the pattern.

First, there will be described a step of registering the vein pattern for use as the reference pattern in the registration database 21.

An object person puts the finger 30 on the transparent member 12, and the finger is irradiated with the near-infrared ray from the backside of the finger (the back of the hand). The ray transmitted through the finger 30 passes through the transparent member 12, and is formed into an image on the image sensor 41 of a CCD, a CMOS or the like by the image forming optical system 40 of the image pickup apparatus 13. Moreover, the image obtained by the image pickup apparatus 13 is sent to the vein pattern extracting section 14 to extract the vein pattern from the image. The extracted vein pattern is registered and stored in the registration database 21 of the identification processing unit 20.

Next, there will be described a step of identifying the newly obtained vein pattern. Since a step of extracting the vein pattern of the object person is similar to the above registering step, description thereof is omitted.

The vein pattern extracted by the vein pattern extracting section 14 and the reference pattern of the object person registered beforehand in the registration database 21 are sent to the identification section 22 of the identification processing unit 20, and the newly obtained vein pattern is collated with the reference pattern. Moreover, a signal concerning a collation and identification result between the vein pattern and the reference pattern is transmitted to various control objects such as a personal computer, a security lock, a cash dispenser of a bank, a cellular phone and a software program which require the identification. In an only case where the vein pattern matches the reference pattern in the identification section 22, the object person can access the control object.

It is to be noted that as a method of setting a registration mode or an identification mode, an arbitrary method may be used. The identification section 22 may be constituted to transmit the signal to the control object in the only case where the vein pattern matches the reference pattern, or may be constituted to transmit a signal indicating that the vein pattern matches the reference pattern in a case where the patterns match each other, and transmit a signal indicating that the patterns do not match each other in a case where they do not match each other.

There has been described above one embodiment of the identification apparatus in which the image forming optical system of the present invention is used, but the identification apparatus using the image forming optical system of the present invention is not limited to this embodiment, and various modifications are possible without departing from the scope of the present invention. For example, in the above embodiment, the apparatus to extract the finger vein pattern is illustrated as the identification apparatus, but the image forming optical system of the present invention can be applied to an identification apparatus in which the vein of the palm or the back of the hand, the fingerprint, the iris, the voice pattern, the face, the handwriting or the like is utilized. The image forming optical system of the present invention can also be applied to an identification apparatus in which a linear bar code, a two-dimensional bar code such as a QR code or the like is utilized instead of biological information. Further, in the above embodiments, although the transmission type optical system in which the light emitted from the light source is transmitted through the object and detected by the image sensor is employed, the reflection type optical system in which the light emitted from the light source is reflected by the object and detected by the image sensor may be used. FIG. 17B shows an example of an identification apparatus in which the reflection type optical system is employed. In FIG. 17B, the light emitted from the light sources 11a and 11b illuminate the fingerprint 35. The light reflected by the fingerprint 35 enters the image pickup apparatus 13 and the image of the fingerprint 35 is formed on the image sensor 14 by the image forming optical system 40. The details of other elements are omitted since the elements designated by the same reference numerals as in FIG. 17A have the same constitutions and functions as those in FIG. 17A.

Moreover, a one-to-one correspondence is not necessarily established between the image pickup unit 10 and the identification processing unit 20 and, for example, a plurality of image pickup units 10 may be connected to one identification processing unit 20. Furthermore, there is not any restriction on a place where, the light source is disposed as long as an image for obtaining a desired biological pattern is obtained via the image pickup apparatus 13.

As described above, in addition to features described in claims, the image forming optical system of the present invention, and the image pickup apparatus and the identification apparatus in which the image forming optical system is used may include the following features:

a) an image forming optical system comprising, in order from an object side: a negative lens; a prism having an incidence surface formed as a concave surface on the object side and an exit surface formed as a convex surface directed toward an image side; an aperture stop; and a double-convex positive lens;

b) an image forming optical system comprising, in order from an object side: a negative lens; a prism having an incidence surface formed as a concave surface on the object side and an exit surface formed as a convex surface directed toward an image side; an aperture stop; a first positive lens; and a second positive lens;

c) an image forming optical system comprising, in order from an object side: a first negative lens; a second negative lens; a prism having an incidence surface formed as a concave surface on the object side and an exit surface formed as a convex surface directed toward an image side; an aperture stop; a first positive lens; and a second positive lens;

d) an image forming optical system comprising, in order from an object side: a negative lens; an optical path deflecting element; an aperture stop; a positive meniscus lens directing its convex surface toward an image side; and a positive lens;

e) an image forming optical system comprising, in order from an object side: a first negative lens; a second negative lens; an optical path deflecting element; an aperture stop; a first positive lens; and a second positive lens; and f) an image forming optical system comprising, in order from an object side: a negative lens; an optical path deflecting element; an aperture stop; a first positive lens; and a second positive lens.

What is claimed is:

1. An image forming optical system comprising, in order from an object side to an image surface:
    a negative lens unit having one or two negative lenses without including any positive lens;
    a reflecting member having an incidence surface which is concave on the object side and an exit surface which is convex toward the image side;
    an aperture stop; and
    a positive lens unit having one or two positive lenses without including any negative lens
    wherein no negative lens is provided between the reflecting member and the image surface.

2. An image forming optical system comprising, in order from an object side:
    a negative lens unit having one or two negative lenses without including any positive lens;
    an optical path deflecting element;
    an aperture stop; and
    a positive lens unit having one or two positive lenses without including any negative lens,
    the image forming optical system being configured to satisfy the following condition:

$0.05 < d_0/Oh < 0.8$, wherein $d_0$ denotes a length from an object point to a lens of the image forming optical system closest to the object side measured on an optical axis, and Oh denotes a maximum object height.

3. The image forming optical system according to claim 1, wherein the following condition is satisfied:

$-3.0 < fn/fp < -0.2$, wherein fn denotes a focal length of the negative lens unit, and fp denotes a focal length of the positive lens unit.

4. The image forming optical system according to claim 2, wherein the following condition is satisfied:

$-3.0 < fn/fp < -0.2$, wherein fn denotes a focal length of the negative lens unit, and fp denotes a focal length of the positive lens unit.

5. The image forming optical system according to claim 1 or 3, wherein the reflecting member includes a reflective surface which deflects an optical path of the image forming optical system, and
    the following condition is satisfied:

$0.15 < df/dr < 1.5$, wherein df denotes a distance along an optical axis from a foremost surface of the negative lens unit to a position to deflect the optical axis of the image forming optical system, and dr denotes a distance along the optical axis from the position to deflect the optical axis to an image surface.

6. The image forming optical system according to claim 2 or 4, wherein the following condition is satisfied:

$$0.15 < df/dr < 1.5,$$

wherein df denotes a distance along the optical axis from a foremost surface of the negative lens unit to a position to deflect the optical axis of the image forming optical system, and dr denotes a distance along the optical axis from the position to deflect the optical axis to an image surface.

7. The image forming optical system according to claim 5, wherein the following condition is satisfied:

$$-5 < fn/Ih < -1,$$

wherein fn denotes the focal length of the negative lens unit, and Ih denotes a maximum image height.

8. The image forming optical system according to claim 6, wherein the following condition is satisfied:

$$-5 < fn/Ih < -1,$$

wherein fn denotes the focal length of the negative lens unit, and Ih denotes a maximum image height.

9. The image forming optical system according to claim 1, wherein the following condition is satisfied:

$$1 < fp/Ih < 5,$$

wherein fp denotes a focal length of the positive lens unit, and Ih is a maximum image height.

10. The image forming optical system according to claim 1, wherein the following condition is satisfied:

$$0.01 < Ih/Oh < 0.1,$$

wherein Ih denotes a maximum image height, and Oh denotes a maximum object height.

11. The image forming optical system according to claim 1, wherein the following condition is satisfied:

$$0.05 < |r_{1r}/r_{in}| < 0.9,$$

wherein $r_{1r}$ denotes a radius of curvature of an image-side surface of the lens in the image forming optical system closest to the object side, and $r_{in}$ denotes a radius of curvature of an incidence refractive surface of the reflecting member.

12. The image forming optical system according to claim 2, wherein the optical path deflecting element includes an incident refractive surface and an exit refractive surface, and the following condition is satisfied:

$$0.05 < |r_{1r}/r_{in}| < 0.9,$$

wherein $r_{1r}$ denotes a radius of curvature of an image-side surface of the lens in the image forming optical system closest to the object side, and $r_{in}$ denotes a radius of curvature of the incidence refractive surface of the optical path deflecting element.

13. The image forming optical system according to claim 1, wherein the following condition is satisfied:

$$0.1 < |f_p/r_{out}| < 1.5,$$

wherein $f_p$ denotes a focal length of the positive lens unit, and $r_{out}$ denotes a radius of curvature of an exit refractive surface of the reflecting member.

14. The image forming optical system according to claim 2, wherein the optical path deflecting element includes an incidence refractive surface and an exit refractive surface, and the following condition is satisfied:

$$0.1 < |f_p/r_{out}| < 1.5,$$

in which $f_p$ denotes a focal length of the positive lens unit, and $r_{out}$ denotes a radius of curvature of the exit refractive surface of the optical path deflecting element.

15. The image forming optical system according to claim 1, wherein the following condition is satisfied:

$$1.45 < n_{avg} < 1.65,$$

in which $n_{avg}$ denotes an average value of refractive indices of all the lenses for use in forming an image.

16. The image forming optical system according to claim 1, wherein the following condition is satisfied:

$$70° < \theta < 110°,$$

wherein θ denotes an angle formed by an optical axis of the negative lens unit and that of the positive lens unit.

17. The image forming optical system according to claim 1, wherein the following condition is satisfied:

$$600 \text{ nm} < \lambda < 950 \text{ nm},$$

in which λ denotes a wavelength of light for use in the image forming optical system.

18. An image pickup apparatus comprising:
the image forming optical system according to claim 1; and
an image sensor disposed on an image side of the image forming optical system.

19. An identification apparatus comprising:
a light source which irradiates an object with light; and
the image pickup apparatus according to claim 18 for picking up an image of the object irradiated with the light from the light source.

20. The identification apparatus according to claim 19, further comprising:
identification processing means for collating information inherent in the object obtained based on data of the image picked up by the image pickup apparatus with reference information registered beforehand to identify the information.

21. The image forming optical system according to claim 1, wherein the reflecting member is formed of a prism.

22. The image forming optical system according to claim 1, wherein the reflecting member is formed of a prism, a negative lens disposed on an incidence side of the prism and a positive lens disposed on an exit side of the prism which are cemented together.

* * * * *